(12) United States Patent
Tani et al.

(10) Patent No.: US 10,160,509 B2
(45) Date of Patent: Dec. 25, 2018

(54) MOTORCYCLE

(71) Applicant: HONDA MOTOR CO., LTD., Tokyo (JP)

(72) Inventors: Yusaburo Tani, Wako (JP); Yusuke Inoue, Wako (JP); Yuji Noguchi, Wako (JP); Masashi Tada, Wako (JP); Tomoya Matsuo, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/042,863

(22) Filed: Feb. 12, 2016

(65) Prior Publication Data

US 2016/0288860 A1  Oct. 6, 2016

(30) Foreign Application Priority Data

Mar. 31, 2015 (JP) ................. 2015-074351
May 12, 2015 (JP) ................. 2015-097037

(51) Int. Cl.
 *B62K 19/30* (2006.01)
 *F02M 35/16* (2006.01)
 (Continued)

(52) U.S. Cl.
 CPC ............. *B62K 19/30* (2013.01); *B62J 23/00* (2013.01); *B62K 11/04* (2013.01);
 (Continued)

(58) Field of Classification Search
 CPC ........ B60K 13/00; B60K 13/02; B62K 19/30; B62K 11/04; B62K 2208/00; F02M 35/02;
 (Continued)

(56) References Cited

U.S. PATENT DOCUMENTS

2003/0226653 A1* 12/2003 Takedomi .......... B60H 1/00278
165/43
2006/0065457 A1   3/2006 Miyabe et al.
(Continued)

FOREIGN PATENT DOCUMENTS

JP      5-46557 Y2    12/1993
JP      06-321152 A   11/1994
(Continued)

*Primary Examiner* — Jacob D Knutson
*Assistant Examiner* — Felicia L. Brittman
(74) *Attorney, Agent, or Firm* — Birch, Stewart, Kolasch & Birch, LLP

(57) ABSTRACT

An air cleaner is disposed at the front part of an intake space below a seat. A battery box containing a battery is disposed on the rear side relative to the air cleaner in the intake space. The battery box is disposed with a rearward tilt and on the intake upstream side of the air cleaner and a corner part of the battery box at the lower front end thereof is disposed close to the air cleaner with the intermediary of a slight gap. The battery in the battery box is located in a flow of intake air sucked into the air cleaner and is efficiently cooled. The battery box includes an opening wherein part of the outer surface of the battery and a degassing part face the opening. An anti-diffusion cover part, continuous with an edge of the opening, covers the degassing part.

7 Claims, 18 Drawing Sheets

(51) Int. Cl.
  *F02M 35/02* (2006.01)
  *F02M 35/10* (2006.01)
  *H01M 2/10* (2006.01)
  *B62J 23/00* (2006.01)
  *B62K 11/04* (2006.01)
  *F02M 35/04* (2006.01)
  *H01M 2/12* (2006.01)

(52) U.S. Cl.
  CPC ........ *F02M 35/0201* (2013.01); *F02M 35/04* (2013.01); *F02M 35/10013* (2013.01); *F02M 35/162* (2013.01); *H01M 2/1083* (2013.01); *H01M 2/12* (2013.01); *B62K 2208/00* (2013.01); *H01M 2220/20* (2013.01)

(58) Field of Classification Search
  CPC ............... F02M 35/0201; F02M 35/04; F02M 35/10013; F02M 35/162; H01M 2/1083; H01M 2/12
  USPC ........................................................ 180/219
  See application file for complete search history.

(56) References Cited

U.S. PATENT DOCUMENTS

| | | | |
|---|---|---|---|
| 2006/0066092 A1* | 3/2006 | Miyabe | B62J 35/00 280/833 |
| 2007/0132225 A1 | 6/2007 | Satake et al. | |
| 2007/0137914 A1 | 6/2007 | Kawase | |
| 2010/0193275 A1* | 8/2010 | Song | B62K 11/04 180/219 |
| 2012/0025510 A1* | 2/2012 | Nishimura | B62J 35/00 280/835 |
| 2012/0145470 A1 | 6/2012 | Fujiyama | |
| 2013/0183558 A1 | 7/2013 | Nakayama et al. | |

FOREIGN PATENT DOCUMENTS

| | | |
|---|---|---|
| JP | 7-132868 A | 5/1995 |
| JP | 2004-011558 A | 1/2004 |
| JP | 2006-78496 A | 3/2006 |
| JP | 2008-80986 A | 4/2008 |
| JP | 2014-65469 A | 4/2014 |

\* cited by examiner

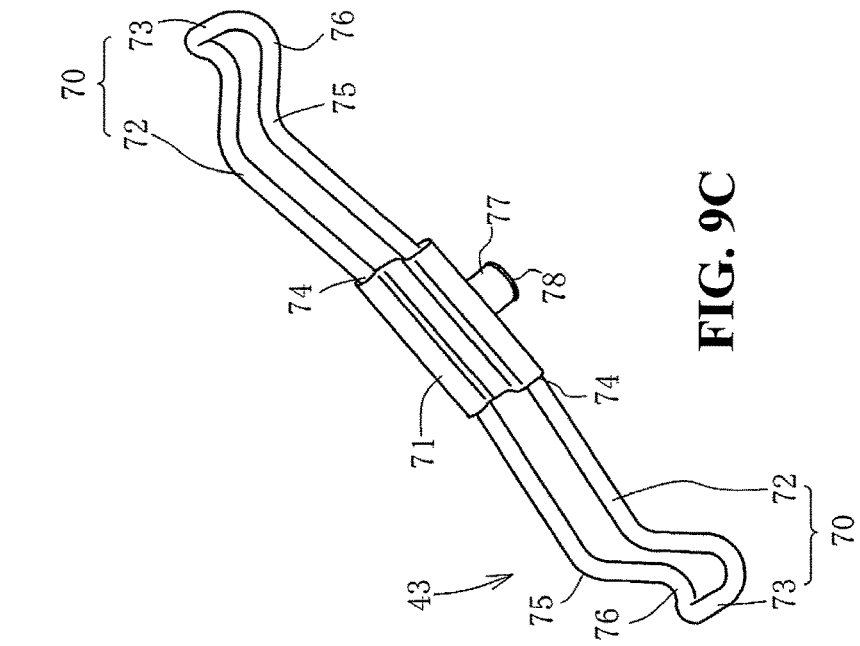
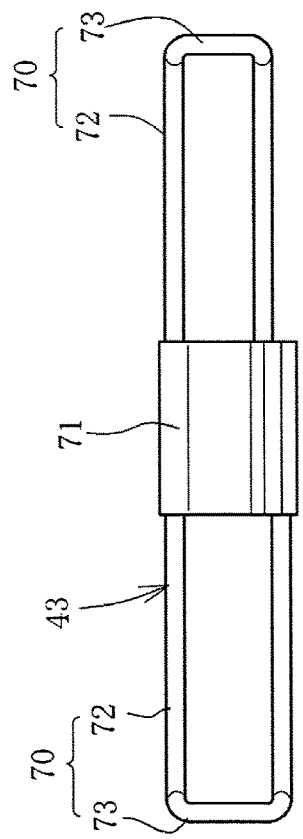
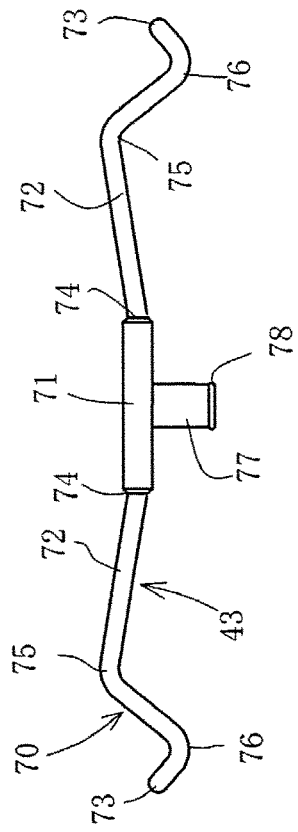
FIG. 9A
FIG. 9B
FIG. 9C

MOTORCYCLE

CROSS-REFERENCE TO RELATED APPLICATIONS

The present application claims priority under 35 USC 119 to Japanese Patent Application No. 2015-074351 filed Mar. 31, 2015 and Japanese Patent Application No. 2015-097037 filed May 12, 2015 the entire contents of which are hereby incorporated by reference.

BACKGROUND OF THE INVENTION

1. Field of the Invention

The present invention relates to a motorcycle including an air cleaner and a battery and particularly to an advantageous placement that improves the cooling performance of the battery. In addition, the present invention relates to a motorcycle including a battery box that houses a battery having a degassing part.

2. Description of Background Art

The inside of an air cleaner case is marked off by an element into a dirty side and a clean side. An air inlet is made in the top surface of the air cleaner case on the dirty side and a connecting tube is provided to the front surface of the air cleaner case on the clean side. In addition, a battery box is provided on a side surface of the connecting tube and a battery is housed in this battery box. See, for example, Japanese Patent Laid-Open No. 2004-011558.

The battery generates heat at the time of charging and discharging and therefore needs to be disposed in a place where the heat is easily released. However, if the battery is housed in a battery box and is disposed on a lateral side of an air cleaner case as in the above-described related art, air in the vicinity of the battery readily remains and dissipation of the heat of the battery is suppressed. Thus, a means for actively cooling the battery is necessary.

A motorcycle with a battery holder having a lower surface to which electrical components are allowed to be attached for effective use of a space is mounted on a pair of left and right rear frames forming part of a vehicle body frame with a battery being housed in the battery holder is known in the art. See, for example, Japanese Patent Laid-Open No. Hei 6-321152.

The current flowing in the battery is normally electronically controlled. However, a gas is often generated at the time of an overcharge attributed to the application of a voltage higher than a prescribed voltage to the battery due to customization by a user or the like. In some cases the battery is provided with a degassing part for venting the gas. In this case, countermeasures against the release of the gas from the degassing part need to be taken.

SUMMARY AND OBJECTS OF THE INVENTION

Therefore, the present invention intends to allow for the efficient cooling of a battery by utilizing the flow of intake air to an engine.

In order to solve the above problem, in an embodiment of the present invention a motorcycle includes an engine (13), an air cleaner (31) that supplies clean air to the engine (13), and a battery (33) that supplies power to at least an ignition system of the engine (13). More specifically, the air cleaner (31) is disposed in an intake space (36) for sucking external air, and the battery (33) is disposed in the intake space (36) and is disposed on an intake upstream side of the air cleaner (31) and close to the air cleaner (31).

According to an embodiment of the present invention, the battery (33) is disposed with a tilt with respect to the air cleaner (31) in such a manner that a corner part (33a) of the battery (33) at a lower end of the battery (33) comes closest to the air cleaner (31).

According to an embodiment of the present invention, the air cleaner (31) includes an element (40), a cleaner case (41) to which the element (40) is attached, and an element fixing component (43) for fixing the element (40) to the cleaner case (41). The element fixing component (43) is allowed to be freely attached and detached to and from the cleaner case (41). In addition, an attachment/detachment part (73) in the element fixing component (43) is disposed on an upper side relative to the corner part (33a) of the battery (33) disposed with the tilt.

According to an embodiment of the present invention, the motorcycle includes a battery box (50) that houses the battery (33) with the battery box (50) being disposed with a tilt with respect to the air cleaner (31) in such a manner that a corner part (51a) of the battery box (50) at a lower end of the battery box (50) comes closest to the air cleaner (31).

According to an embodiment of the present invention, the battery box (50) has a vent (57) in a wall part (53) on a vehicle rear side.

According to an embodiment of the present invention, the battery box (50) includes wall parts surrounding the battery (33) on four sides and is fixed to vehicle body frames (21•55) at three wall parts (52•53) among the wall parts.

According to an embodiment of the present invention, the air cleaner (31) includes an element (40), a cleaner case (41) to which the element (40) is attached, and an element fixing component (43) for fixing the element (40) to the cleaner case (41). The element fixing component (43) is allowed to be freely attached and detached to and from the cleaner case (41). In addition, an attachment/detachment part (73) in the element fixing component (43) is disposed on an upper side relative to the corner part (51a) of the battery box (50) disposed with the tilt.

According to an embodiment of the present invention, the element (40) has an inclined side surface (62) and the attachment/detachment part (73) in the element fixing component (43) is provided over the inclined side surface (62) of the element (40).

According to an embodiment of the present invention, the element fixing component (43) includes an element attachment part (77) that is engaged with the element (40) and is held.

According to an embodiment of the present invention, the battery is disposed in the flow of intake air toward the engine. Thus, the battery can be efficiently cooled by utilizing the flow of the intake air toward the engine. Simultaneously, the battery is disposed near the air cleaner that is disposed close to the engine and is located near the center of gravity of the vehicle. Therefore, the battery, a heavy component, can be disposed near the engine, i.e. near the center of gravity of the vehicle. Thus, a concentration of mass on the center of gravity of the vehicle can be achieved and the traveling stability can be improved.

According to an embodiment of the present invention, the battery is tilted with respect to the air cleaner and is disposed so that the corner part thereof at the lower end part comes closest to the air cleaner. Therefore, a space between the air cleaner and the battery can be ensured and thus the efficiency of intake to the engine can be improved.

According to an embodiment of the present invention, the attachment/detachment part of the element fixing component is disposed on the upper side relative to the corner part of the battery. Therefore, the fixing part of the element can be visually recognized in the state in which the battery is mounted. Thus, the element can be easily attached and detached.

According to an embodiment of the present invention, the battery is housed in the battery box and this battery box is tilted with respect to the air cleaner and is so disposed that the corner part thereof at the lower end part comes closest to the air cleaner. Therefore, the battery can be protected in the battery box and the flow of winds to the battery can be formed. Thus, the battery can be cooled.

In addition, a space between the air cleaner and the battery box can be ensured and thus the efficiency of intake to the engine can be improved.

According to an embodiment of the present invention, in the battery box, the vent is made in the wall part on the vehicle rear side and thus the flow of intake air can be introduced from this vent to around the battery. Therefore, the battery housed in the battery box can also be efficiently cooled.

According to an embodiment of the present invention, three wall parts in the battery box among the wall parts surrounding the battery on four sides are fixed to the vehicle body frames that are rigid bodies. Thus, these wall parts are strongly supported to the vehicle body frames and the support rigidity of the battery box can be enhanced.

According to an embodiment of the present invention, the attachment/detachment part of the element fixing component is disposed on the upper side relative to the corner part of the battery box. Therefore, the fixing part of the element can be visually recognized in the state in which the battery box is mounted. Thus, the element can be easily attached and detached.

According to an embodiment of the present invention, the attachment/detachment part of the element fixing component is provided over the inclined side surface of the element. This allows a worker to put a hand in the upper-side space made due to the inclination of the side surface of the element and carry out maintenance such as an operation of attaching or detaching the element fixing components. Therefore, the space for the attachment/detachment operation can be ensured and the work of attaching or detaching the element can be made easy.

According to an embodiment of the present invention, at the time of attachment or detachment of the element, the element fixing component can be prevented from dropping off from the element and be integrally treated because the element attachment part provided on the element fixing component is engaged and integrated with the element. This makes work of attaching or detaching the element easy.

An object of an embodiment of the present invention is to provide a motorcycle configured to enable prevention of diffusion of a gas to the inside of the vehicle body at the time of degassing from a battery.

In order to achieve the above object, according to an embodiment of the present invention a motorcycle includes a battery box in which a battery having a degassing part is housed. The battery is housed in the battery box in which an opening is made in such a manner that part of an outer surface of the battery and the degassing part are made to face the opening and an anti-diffusion cover part that is continuous with an edge of the opening and covers the degassing part is provided.

According to an embodiment of the present invention, the battery box is provided with a fixing member for detachably fixing, in the battery box, the battery housed in the battery box in such a manner that at least part of the fixing member overlaps with the anti-diffusion cover part.

According to an embodiment of the present invention, a cover member having at least a rear wheel cover part that is disposed below the battery box and covers a rear wheel from above is attached to a vehicle body frame. Furthermore, a bottom wall of the battery box is formed with an inclination in such a manner so as to be located closer to a lower side when getting closer to an inner surface of the rear wheel cover part. A discharge port, opened toward a side of the rear wheel cover part, is made at a lowermost part of the bottom wall.

According to an embodiment of the present invention, the battery box dispose to have an interval from the cover member is supported by the vehicle body frame with a guide wall that guides a liquid discharged from the discharge port to a side of the cover member being provided monolithically with the bottom wall of the battery box.

According to an embodiment of the present invention, the cover member is formed to monolithically have the rear wheel cover part that has a cross-sectional shape curved to bulge upwardly at least at a central part in a vehicle width direction with a smoothed inner surface and a pair of side cover parts that are provided consecutively with both sides of the rear wheel cover part in the vehicle width direction and extending upwardly.

According to an embodiment of the present invention, a restricting wall for restricting a flow direction of a liquid discharged from the discharge port is provided in a protruding manner on an inner surface of the cover member.

According to an embodiment of the present invention, a bottom part of an uncleaned air chamber facing a cleaner element of an air cleaner of an internal combustion engine mounted on the vehicle body frame is formed by the rear wheel cover part of the cover member. The anti-diffusion cover part is provided in the battery box continuously with a side surface facing a side of the cleaner element among side surfaces of the battery box disposed in the uncleaned air chamber.

According to an embodiment of the present invention, the battery box is disposed in the uncleaned air chamber in such a manner as to be located on an upstream side in the flow direction of air in the uncleaned air chamber with a vent hole being made at an upstream-side end part of the battery box in the flow direction.

According to an embodiment of the present invention, the fixing member, formed into a band shape by an elastic material, passes through the vent hole and is fixed to one side surface of the battery box and an attachment piece that disengageably engages with another side surface of the battery box and has a width larger than a width of the vent hole is provided at another end part of the fixing member.

According to an embodiment of the present invention, the battery is housed so that part of the outer surface of the battery is made to face the external through the opening of the battery box. Thus, heat release from the battery can be facilitated and heat accumulation of the battery can be suppressed. In addition, the replacement of the battery can be made easy. Furthermore, the degassing part possessed by the battery is disposed to face the opening and the battery box is provided with the anti-diffusion cover part that covers the degassing part. Therefore, when a gas generated at the time of an overcharge of the battery is vented from the degassing part, diffusion of the vented gas to the inside of the vehicle body can be prevented by the anti-diffusion cover part.

According to an embodiment of the present invention, at least part of the fixing member provided for the battery box to detachably fix the battery in the battery box overlaps with part of the anti-diffusion cover part. Therefore, the fixing member is disposed near the degassing part in the state in which the battery is fixed by the fixing member. Thus, diffusion of the gas vented from the degassing part to the inside of the vehicle body is prevented more effectively, and replacement of the battery is easy when the fixing of the battery is released.

According to an embodiment of the present invention, the bottom wall of the battery box is inclined to be located closer to the lower side when getting closer to the inner surface of the rear wheel cover part disposed below the battery box with the discharge port being opened toward the side of the rear wheel cover part and is made at the lowermost part of the bottom wall. Thus, a liquid in the battery box is caused to drop from the discharge port to the side of the rear wheel cover part and the liquid travels on the inner surface of the cover member. Therefore, the liquid in the battery box can be discharged from the inside of the battery box without being splashed.

According to an embodiment of the present invention, the liquid discharged from the discharge port is guided to the side of the cover member by the guide wall provided monolithically with the bottom wall of the battery box. Thus, the liquid can be led to the inner surface side of the cover member without being splashed. In addition, because an interval is made between the battery box and the cover member, vibrations are not conveyed from the side of the cover member to the side of the battery box.

According to an embodiment of the present invention, the cover member monolithically has the rear wheel cover part that has the curved cross-sectional shape bulging upwardly at least at the central part in the vehicle width direction and has the smoothed inner surface and the pair of side cover parts extending upwardly from both sides of the rear wheel cover part in the vehicle width direction. Therefore, the liquid that drops from the discharge port to the side of the rear wheel cover part is smoothly led to the part between the rear wheel cover part and one side cover part along the inner surface of the part having the cross-sectional shape bulging upwardly in the rear wheel cover part. This can more surely suppress splashing of the liquid to the inside of the vehicle body.

According to an embodiment of the present invention, by restricting the flow direction of the liquid discharged from the discharge port by the restricting wall provided in a protruding manner on the inner surface of the cover member, the liquid can be led to a predetermined site without spreading on the inner surface of the cover member.

According to an embodiment of the present invention, the bottom part of the uncleaned air chamber facing the cleaner element is formed by the rear wheel cover part of the cover member with the battery box being disposed in the uncleaned air chamber. Thus, the battery can be protected by the cover member and the battery can be effectively cooled by utilizing the flow of intake air in the uncleaned air chamber. In addition, because the anti-diffusion cover part is continuous with the side surface facing the side of the cleaner element among the side surfaces of the battery box, the flowing of the gas vented from the degassing part of the battery to the side of the cleaner element can be suppressed.

According to an embodiment of the present invention, the battery box is disposed on the upstream side in the flow direction of air in the uncleaned air chamber and the vent hole is made at the upstream-side end part of the battery box in the flow direction. Thus, intake air can be made to flow on the lateral sides of the battery in the battery box, which enables effective cooling of the battery.

According to an embodiment of the present invention, the band-shaped fixing member composed of the elastic material passes through the vent hole and is fixed to the one side surface of the battery box and the attachment piece that has a width larger than the width of the vent hole and is provided at the other end part of the fixing member disengageably engages with the other side surface of the battery box. Thus, by engaging the attachment piece with the peripheral part of the vent hole when the battery is removed, the fixing member can be prevented from coming off from the battery box, which can achieve an improvement in the working performance in battery replacement or the like.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 9A, 9B and 9C show diagrams showing an element fixing component; and

DETAILED DESCRIPTION OF THE PREFERRED EMBODIMENTS

Figure 1:
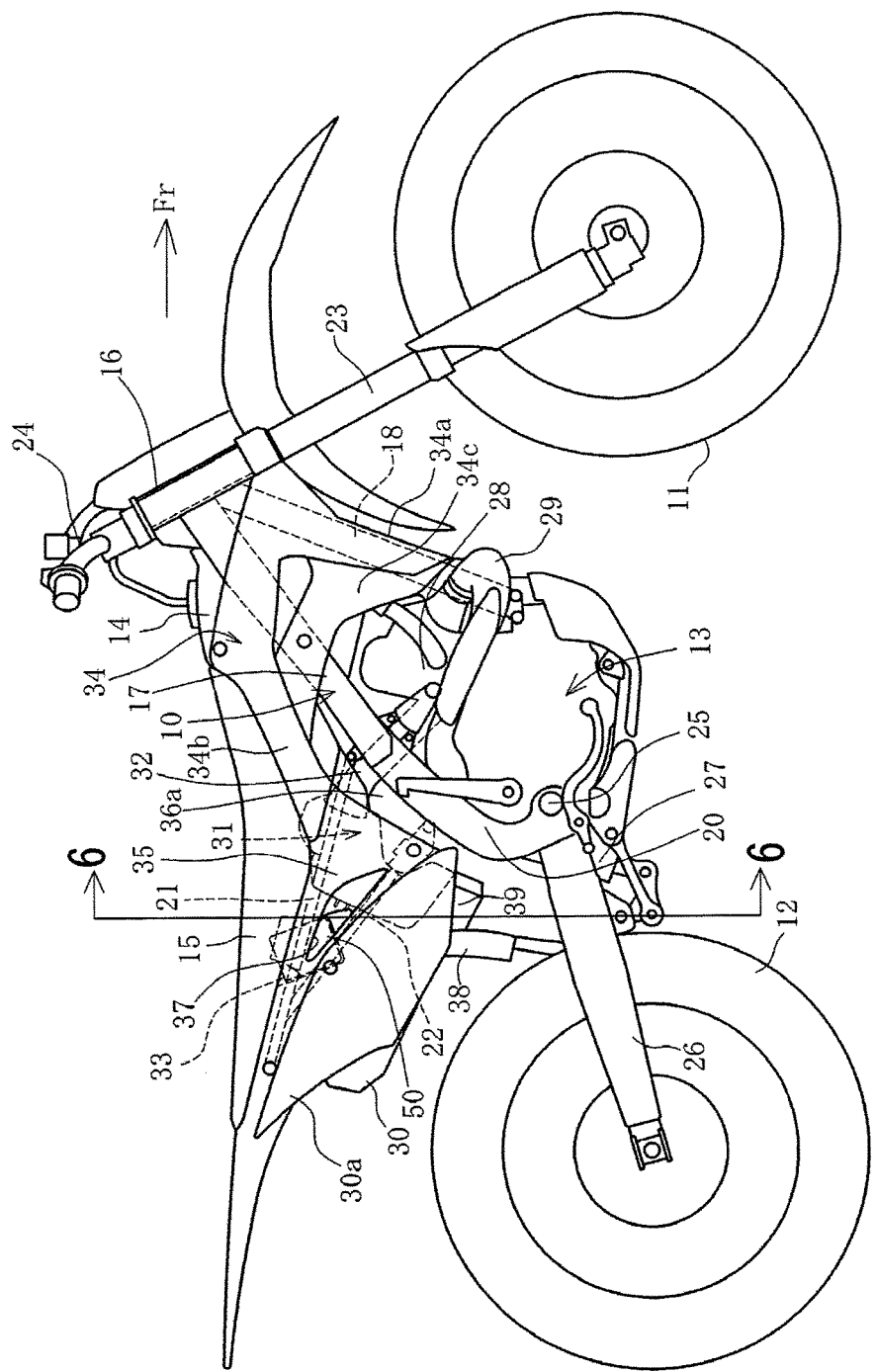
FIG. 1 is a right side view of a motorcycle according to an embodiment.

An embodiment of the invention of the present application will be described below on the basis of the drawings. In the following description, terms such as front, back, left, right, upper, and lower are based on the respective directions of the vehicle. Furthermore, the front side, the left side, and the right side are indicated as Fr, L, and R, respectively, by arrows in the drawings.

Figure 2:
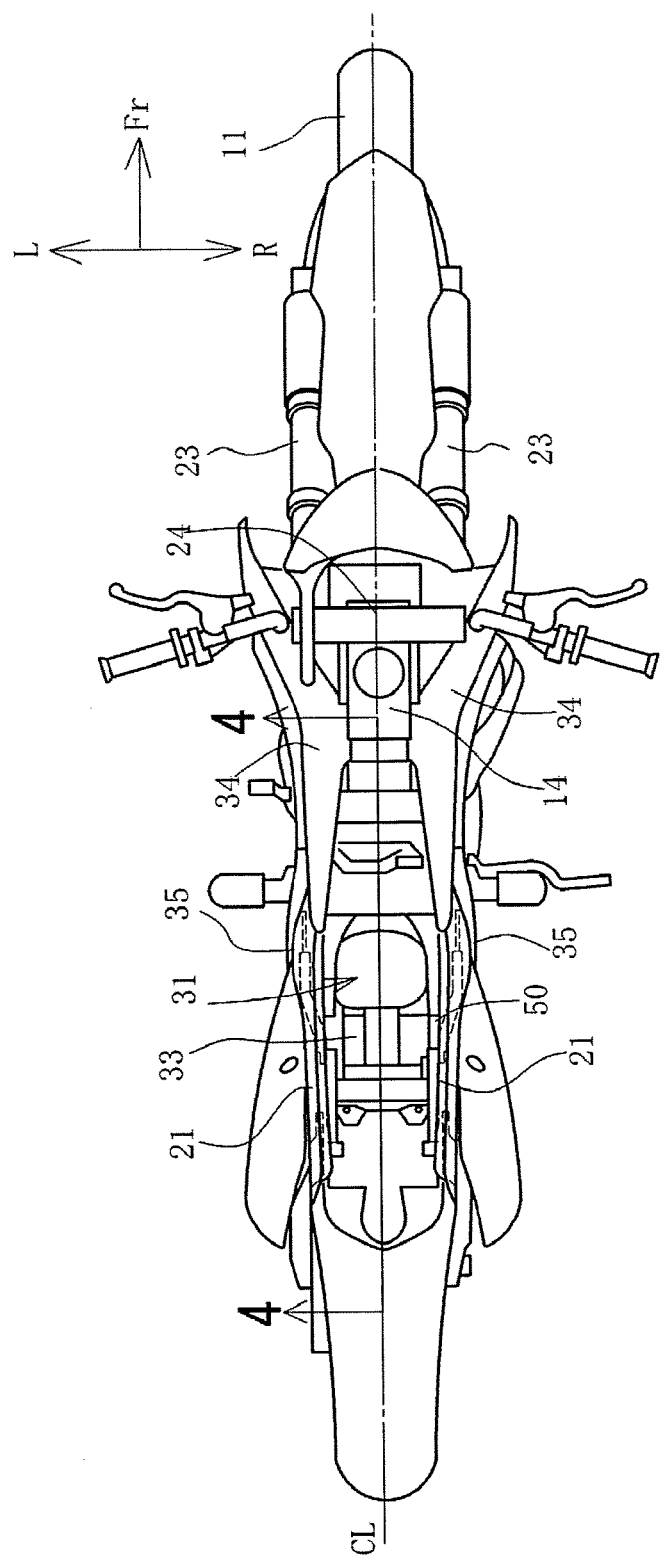
FIG. 2 is a plan view of the motorcycle (state in which a seat is removed)

FIGS. 1 and 2 illustrate the outline of the whole of a motorcycle formed as an off-road vehicle. FIG. 2 shows a state wherein a seat is removed.

A vehicle body frame 10 supports a front wheel 11 and a rear wheel 12 on the front and rear sides and supports an engine 13 at an intermediate part between the front wheel 11 and the rear wheel 12. The engine 13 is located near the center of gravity of the vehicle and a fuel tank 14 is disposed above the engine 13. A seat 15 is disposed on the rear side of the fuel tank 14.

The vehicle body frame 10 has the following components main frames 17 that extend from a head pipe 16 at the front end as a pair of left and right frames and pass above the engine 13 to obliquely extend toward the lower rear side with a down frame 18 that extends from the head pipe 16 to the front side of the engine 13 obliquely downward. A pair of left and right pivot frames 20 extend from the main frames 17 to the rear side of the engine 13 obliquely downwardly with a pair of left and right seat rails 21 that extend from the rear end parts of the main frames 17 toward the upper rear side obliquely and support the seat 15. A pair of left and right backstays 22 obliquely join the rear end parts of the seat rails 21 to the intermediate parts of the pivot frames 20 in the upward-downward direction.

The front wheel 11 is supported by the lower end parts of a pair of left and right front forks 23 with the front wheel 11 being pivotally supported to the head pipe 16 for steering by a handlebar 24.

The front end part of a rear swing arm 26 is supported at the lower end parts of the pivot frames 20 swingably in the upward-downward direction by a pivot shaft 25 with the rear wheel 12 being supported by the rear end part of the rear swing arm 26. A shock absorber unit 27 of a rear suspension is disposed between the front part of the rear swing arm 26 and the upper part of the pivot frame 20.

The engine 13 has a forward-tilted cylinder unit 28. An exhaust tube 29 extends forward from the front surface of the cylinder unit 28 and bends rearwardly to pass through the right side of the cylinder unit 28 and be connected to mufflers 30 above the rear wheel 12. The mufflers 30 are provided as a pair of left and right mufflers with the exhaust tube 29 branching toward the left and right mufflers 30 on the rear side of the cylinder unit 28.

An intake passage is opened in the rear surface of the cylinder unit 28 and a connecting tube 32 extending forward from an air cleaner 31 and disposed below the front part of the seat 15 is connected to the intake passage.

External air is sucked from a space formed on the rear side of the air cleaner 31 and below the seat 15.

The fuel tank 14 and the side surfaces of the vehicle body below the front part of the seat 15 are covered by a pair of left and right tank shrouds 34. The tank shrouds 34 each include a front part 34a extending from the vicinity of the top part of the fuel tank 14 toward the lower front side obliquely, a rear part 34b obliquely extending toward the lower rear side, and a joining part 34c that obliquely joins them. The tip parts of the rear parts 34b extending rearwardly are fixed onto the seat rails 21 on the upper side of the air cleaner 31, which is on the rear side of the fuel tank 14.

The side surfaces of the vehicle body below the seat 15 are covered by the tank shrouds 34 and side covers 35. The side covers 35 cover, as a pair of left and right covers, parts that are surrounded by the pivot frame 20, the seat rail 21, and the backstay 22 and have a substantially triangular shape in a side view from the lateral sides, and the front end parts of the side covers 35 are connected to the rear parts 34b of the tank shrouds 34.

A gap (side open part 36a) is formed between the front end part of the side cover 35 and the rear part 34b of the tank shroud 34 and the main frame 17 and the pivot frame 20.

Furthermore, a side vent 37 is formed at the rear part of the side cover 35 and on a lateral side of a battery box 50. A muffler cover 30a and a rear fender 38 are provided.

Figure 3:
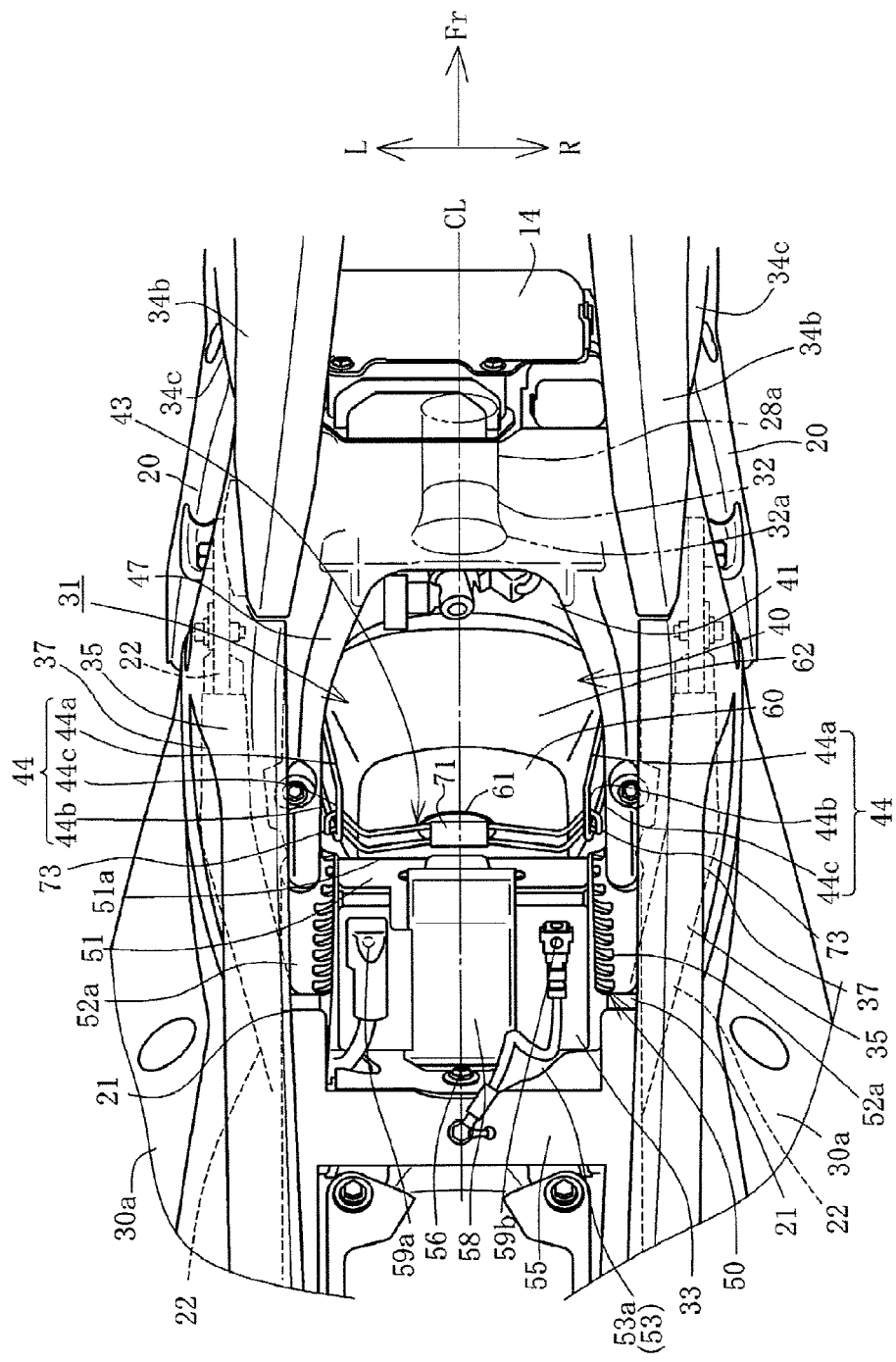
FIG. 3 is an enlarged view of a major part in FIG. 2.

Details of the air cleaner 31 and a battery 33 will be described below by FIGS. 3 to 10. FIG. 3 shows a state in which the seat 15 is removed and FIGS. 5 and 6 each show a state in which the seat 15 and the side covers 35 are removed.

First, the outline of placement relating to the air cleaner 31 and the battery 33 will be described.

As shown in FIG. 3, on a vehicle body center CL, the air cleaner 31 is disposed on the front side and the battery 33 is disposed on the rear side of the air cleaner 31 in one straight line. Although not apparent from this diagram, the connecting tube 32 extending to the front side of the air cleaner 31, an inlet 32a thereof, and an intake tube 28a and an intake passage 28b to be described later also exist on the vehicle body center CL. The air cleaner 31 takes in external air from the rear side and therefore the battery 33 is disposed on the intake upstream side of the air cleaner 31.

Figure 4:
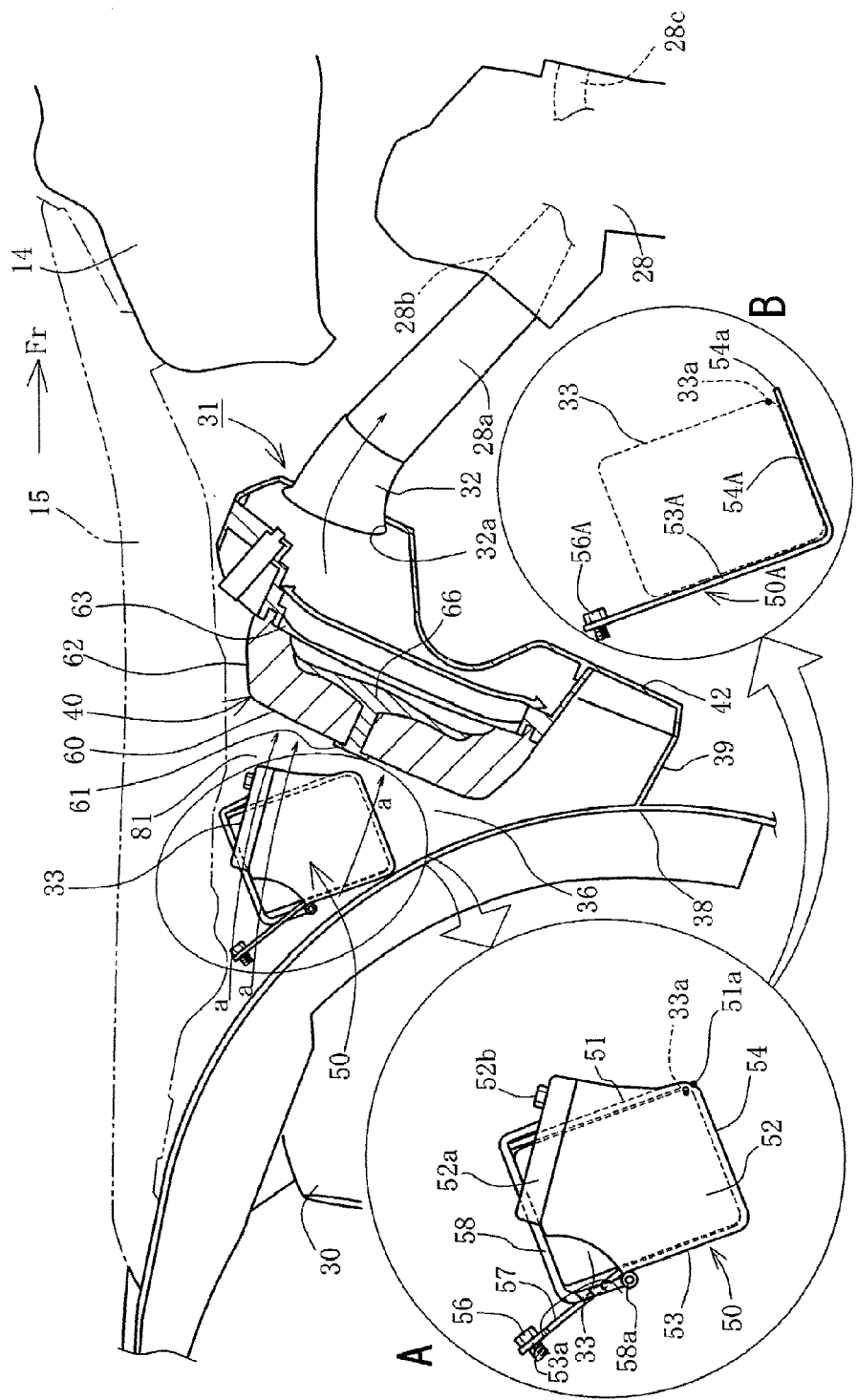
FIG. 4 is a sectional view along line 4-4 in FIG. 2.

As shown in FIG. 4, the air cleaner 31 is disposed with a forward tilt below the seat 15 and the connecting tube 32 extending to the front side of the air cleaner 31 obliquely extends from the upper part of the air cleaner 31 toward the lower front side and is connected to the intake passage 28b opened in the back surface of the cylinder unit 28 via the intake tube 28a. An exhaust passage 28c with the exhaust tube 29 being connected thereto is provided. In view of the fact that the air cleaner 31 is disposed close to the engine 13, the air cleaner 31 is also located near the center of gravity of the vehicle.

The air cleaner 31 includes an element 40 on the rear side and a cleaner case 41 attached to the front part of the element 40. The rear end part (upstream-side end part) of the connecting tube 32 is connected to the inlet 32a made at a base part 42 that is the front part of the cleaner case 41.

In the air cleaner 31, a case cover that is used with respect to a box-shaped air cleaner case, like existing ones, that covers the dirty side is omitted. Therefore, while the inside of the cleaner case 41 is the clean side, the dirty side is the whole of an intake space 36 formed on the rear side of the air cleaner 31 and below the seat 15.

More specifically, the element 40 is housed in the front part of the intake space 36. External air is sucked from the intake space 36 on the rear side into the inside of the air cleaner 31 and is purified by the element 40. Then, the purified air passes through the clean side inside the cleaner case 41 and is sent from the connecting tube 32 to the intake passage 28b.

The air cleaner 31 is housed in the intake space 36 surrounded by the fuel tank 14 and the seat 15 on the upper side, the seat rails 21 and the backstays 22 on the left and right sides, the rear fender 38 on the rear side, and an under-cover 39 on the lower side.

The left and right sides of this intake space 36 are covered by the side parts of the under-cover 39 and the side covers 35.

This intake space 36 communicates with external air on the lateral sides of the vehicle body through the side open part 36a and the side vent 37 (FIG. 1). Furthermore, although not apparent in this diagram, the intake space 36 communicates with external air on the rear side through a gap formed between the rear fender 38 and the seat 15 and the rear part of the battery box 50.

Because the air cleaner 31 takes in external air from the intake space 36, a flow a of intake air in the front-rear direction from the rear side toward the air cleaner 31 is generated in the intake space 36.

In this intake space 36, the battery 33 is disposed on the rear side of the air cleaner 31 in a state of being housed in the battery box 50 opened upwardly. The battery 33 is disposed in the flow of intake air (shown by arrows a) from the upstream side of the air cleaner 31 toward the element 40 and is cooled by this intake air.

The battery 33 and the battery box 50 are disposed at a position separate from the top part toward the front side by about 45 degrees of a central angle in the rear fender 38 having a substantially circular arc shape and are disposed with a rearward tilt along a curved surface of the rear fender 38 extending toward the lower front side. A corner part 51a of the battery box 50 at the front lower end part thereof protrudes to come close to the vicinity of the intermediate part of the element 40 in the upward-downward direction and a slight gap is formed between the corner part 51a and the element 40.

The element 40 and the cleaner case 41 are fixed by engaging an element fixing component 43 attached to the element 40 with a pair of left and right attachment fittings 44 that extend upwardly from both side parts of the cleaner case 41 and have a substantially U-shape in a side view. The attachment fittings 44 each include an upper side 44a and a lower side 44b that extend on the upper and lower sides and a locking part 44c that joins them. The locking parts 44c overlap with the side surfaces of the element 40.

Figure 5:
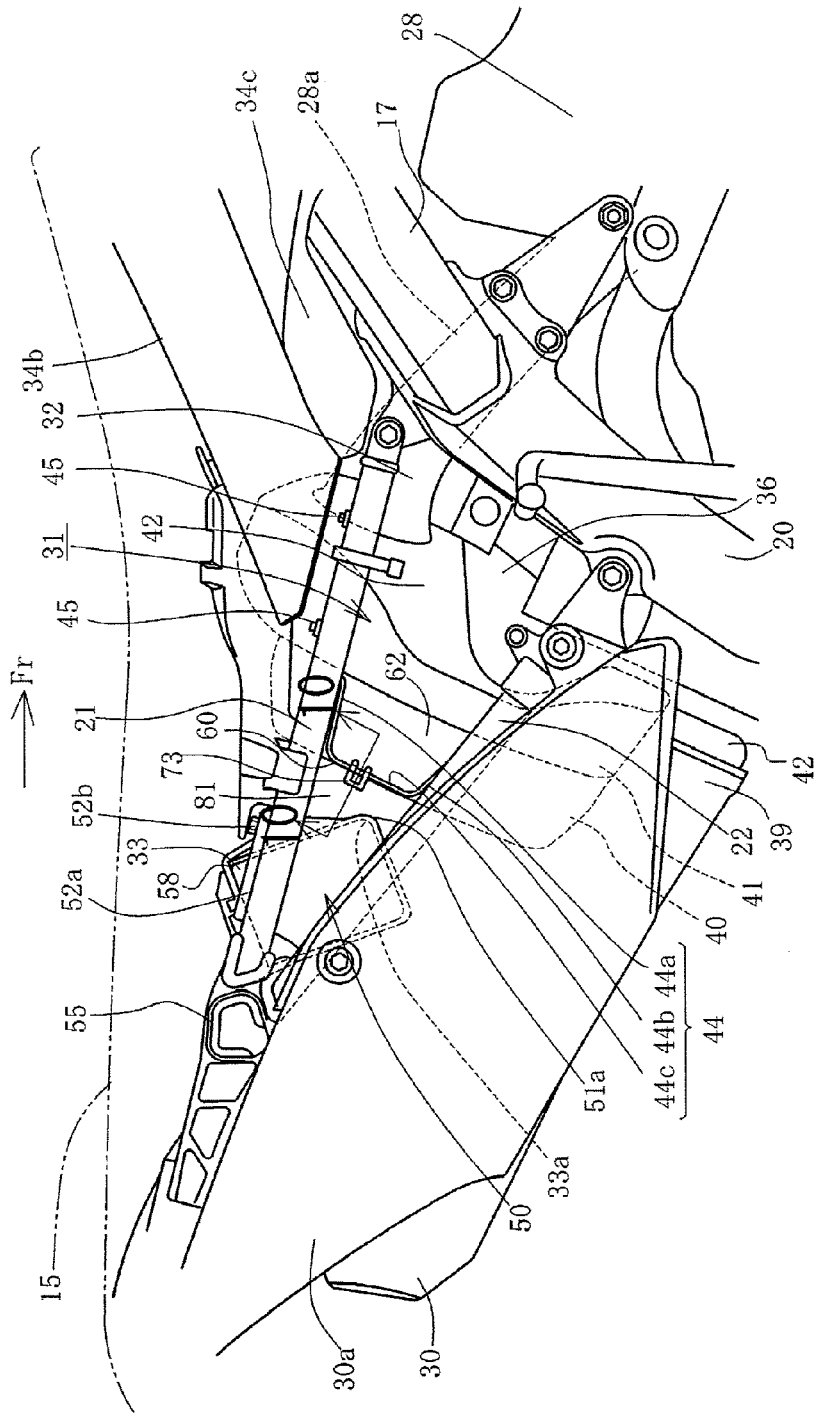
FIG. 5 is a side view of the part shown in FIG. 3 (state in which the seat and a side cover are removed)

The engaging parts of the element fixing component 43 to the attachment fittings 44 (hook parts 73 to be described later, equivalent to the fixing parts of the element fixing component 43 in the invention of the present application) are located on the upper side relative to the corner part 51a of the battery box 50 at the front lower end part thereof (FIG. 5).

The battery 33 housed in the battery box 50 also tilts rearwardly similarly due to the tilt of the battery box 50 and a corner part 33a at the front lower end part thereof also exists at a position close to the element 40 substantially as with the corner part 51a of the battery box 50.

More detailed structures of the respective parts will be described below.

As shown in FIG. 5, the upper end part of the cleaner case 41 is fixed onto the seat rails 21 by bolts 45.

As shown in FIG. 3, the upper side of the front part of the air cleaner 31 is partly covered by an under-seat cover 47. The under-seat cover 47 is provided below the front part of the seat 15 and has a substantially U-shape opened rearwardly in a plan view. The intermediate part thereof in the vehicle width direction opens the upper side of the element 40 and the end parts thereof in the vehicle width direction are disposed across a range from the rear parts 34b of the tank shrouds 34 to the intermediate parts of the seat rails 21 and are fixed on the seat rails 21. The upper side of the air cleaner 31 and the battery 33 is opened in a plan view.

The lower end part of the base part 42 is joined to the front part of the lower end of the under-cover 39 (see FIG. 4).

As shown in FIG. 4, the lower side of the intake space 36 is covered by the under-cover 39 and the air cleaner 31 is housed inside the intake space 36.

The under-cover 39 is formed on the front side of the rear fender 38 continuously with the lower part of the front side of the rear fender 38 and covers the lower side of the intake space 36, with a cross-section thereof having a substantially U-shape.

The left and right sides of the upper part of the intake space 36 are covered by the side covers 35. Furthermore, the air cleaner 31 is housed in this space in a state of comparatively having gaps on the upper, lower, left, and right sides thereof and can take in external air from the whole circumference of the element 40.

Next, the respective details of the element 40 and the element fixing component 43 will be described.

Figure 8A:
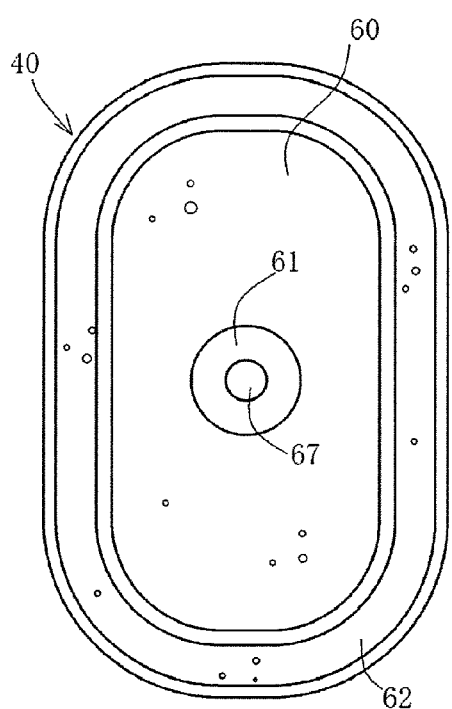
FIGS. 8A, 8B and 8C show diagrams showing an element.
Figure 8B:
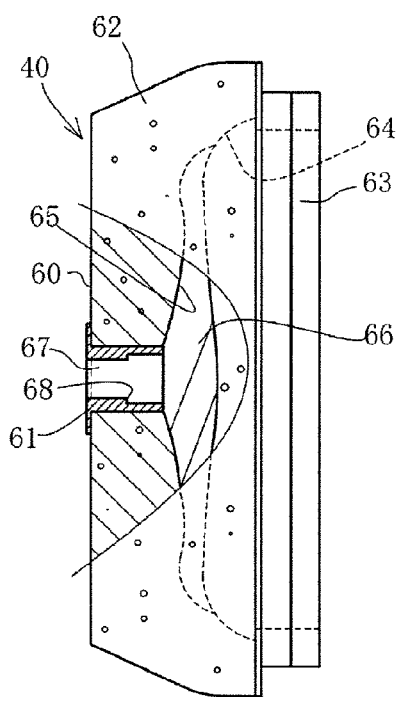
Figure 8C:
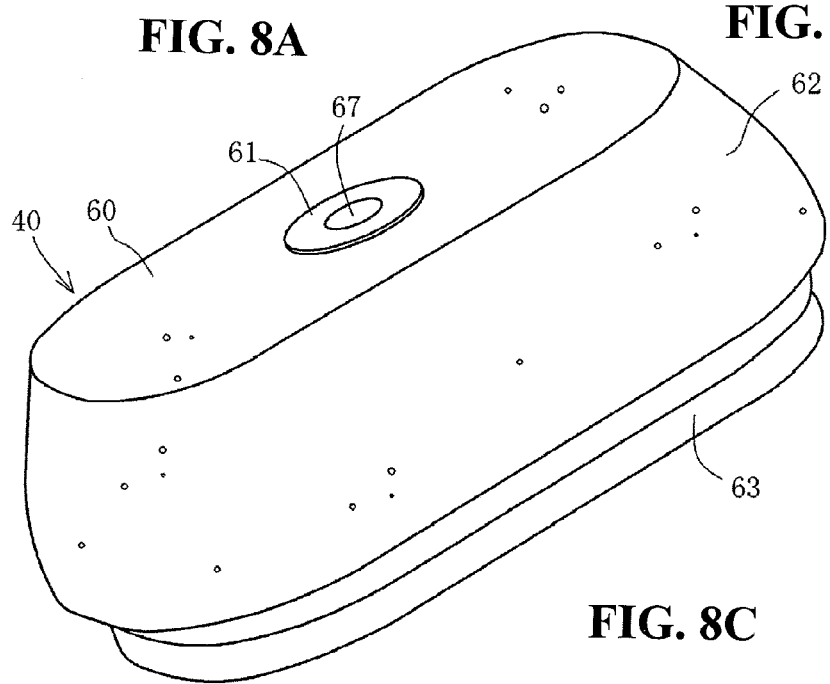

FIGS. 8A, 8B and 8C explain the details of the element 40. FIG. 8A is a plan view of the element 40. FIG. 8B is a side view and FIG. 8C is perspective view. As shown in these diagrams, the element 40 is formed of an appropriate communicating foam resin such as an urethane foam and a central holder 61 is provided at the center of a top surface 60. The top surface 60 has a substantially oval shape or a substantially elliptical shape and is disposed, with the longer diameter side oriented along the upward-downward direction and with the shorter diameter side oriented along the left-right direction. A side surface 62 is an inclined surface tapered toward the top surface 60 and is formed across the whole circumference.

At the lower part, a fitting cylindrical part 63 is formed that is fitted to the cleaner case 41 and has a reduced diameter.

A recess 64 opened in a forward direction is formed inside the element 40 with a bottom surface 65 facing the recess 64 being supported by an element holder 66. The element holder 66 is a frame body formed of a linear support member having a radial shape and the inside end part of the central holder 61 in the axial direction is made monolithic with the central part of the element holder 66. The inside of the element 40 and the central holder 61 refers to the side of the recess 64 and the outside refers to the side of the top surface 60.

The central holder 61 is a cylindrical member provided at the center (position of the center of gravity) of the element 40 with penetration in the wall thickness direction and is made monolithic with the center of the element 40. One end part of the central holder 61 in the axial direction has a flange shape and exists on the surface of the top surface 60, and the other end side serves as a hub of the element holder 66 having the radial shape. The central holder 61 is made monolithic with the center of the element 40 (position of the center of gravity of the element 40). A shaft hole 67 penetrating in the axial direction is made in the central holder 61. The hole diameter of the shaft hole 67 changes in the axial direction from a smaller-diameter part on the side of the top surface 60 to a larger-diameter part on the inside and this change part of the hole diameter serves as a step 68.

FIGS. 9A, 9B and 9C show the details of the element fixing component 43. FIGS. 9A, 9B, and 9C are a plan view, a side view, and a perspective view, respectively. As shown in these diagrams, the element fixing component 43 includes a frame portion 70 made by processing a metal linear material into a substantially oblong rectangular shape and a plate-shaped portion 71 that links the intermediate parts of the long sides of the frame portion 70. The frame portion 70 includes a pair of long side parts 72 and a pair of hook parts 73 as short side parts.

The long side parts 72 of the frame portion 70 are each inclined to obliquely rise from a first bending part 74 at an end part of the plate-shaped portion 71 and each bend downward at a second bending part 75 near the hook part 73. Furthermore, at the root of the hook part 73 at the tip, the long side parts 72 each bend upward at a third bending part 76. Therefore, the hook parts 73 bend upwardly and the attachment fittings 44 can be engaged with the third bending parts 76 at the roots of the hook parts 73.

An element attachment part 77 having a shaft shape protruding downwardly is provided at the center of the plate-shaped portion 71 and an engagement protrusion 78 extending outwardly is formed at the tip of the element attachment part 77.

The element attachment part 77 is inserted into the shaft hole 67 of the central holder 61. In this shaft hole 67, the engagement protrusion 78 engages with the step 68 in the shaft hole 67.

By inserting the element attachment part 77 into the shaft hole 67 of the central holder 61 and engaging the engagement protrusion 78 with the step 68 in the shaft hole 67, the element 40 with which the element fixing component 43 is integrated is integrated with the cleaner case 41 by fitting the fitting cylindrical part 63 to the periphery of the opening part of the cleaner case 41 and then engaging the element fixing component 43 with the attachment fittings 44 provided on the cleaner case 41, so that the air cleaner 31 is assembled.

At this time, the long side parts 72 of the element fixing component 43 have a spring characteristic because bending at the first bending part 74, the second bending part 75, and the third bending part 76. Thus, by bending the long side parts 72 and locking the hook parts 73 to the attachment fittings 44, the element 40 can be strongly pressed against and fixed to the cleaner case 41 through the central holder 61.

Figure 10:
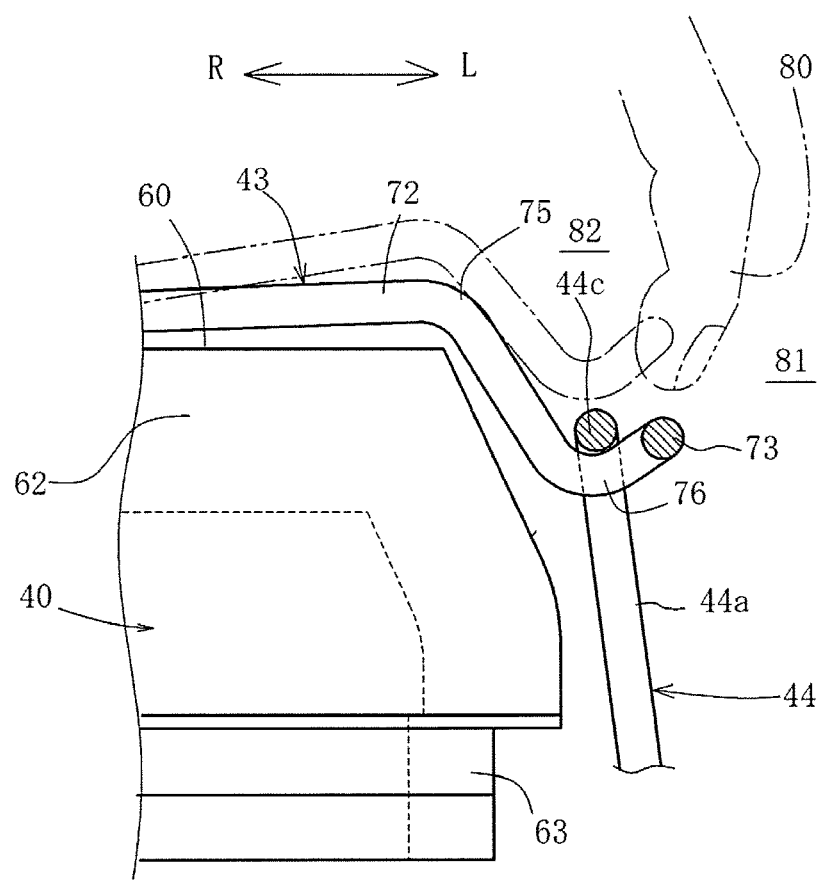
FIG. 10 is a sectional view along line 10-10 in FIG. 5.

As shown in FIG. 10, the side surface 62 of the element 40 is a tapered inclined surface and therefore a working space 82 is formed above the side surface 62. The engagement part between the hook part 73 and the locking part 44c of the attachment fitting 44 exists in the working space 82 above the side surface 62 and is located inside relative to the outer circumferential part of the air cleaner 31. Thus, a hand 80 can be put in the working space 82 from above and the hook part 73 can be disengaged. The working space 82 is part of a space 81 having a substantially V-shape.

As shown in FIGS. 3 to 6, particularly in an encircled enlarged part A in FIG. 4, the battery box 50 has a box shape opened upward and has a front wall 51, sidewalls 52, a rear wall 53, and a bottom part 54. Due to the placement of the battery box 50 with a rearward tilt, the corner part 51a formed between the lower end part of the front wall 51 and the bottom part 54 protrudes in a forward direction and is located over the top surface of the element 40 and near the element fixing component 43 with the intermediary of a slight gap. In the encircled enlarged part in FIG. 4, the battery box 50 in FIG. 4 is shown in an enlarged manner.

The sidewalls 52 have flanges 52a made by extending the upper ends outwardly. The flanges 52a are put on the seat rails 21 and are fixed by bolts 52b. Therefore, the sidewalls 52 are supported by the seat rails 21 (see FIG. 5). The upper part of the rear wall 53 forms an extended part 53a protruding upwardly and the upper end part thereof is attached to a cross member 55 joining the left and right seat rails 21 by a bolt 56. Below the bolt 56 of the extended part 53a, a comparatively-large rear wall vent 57 is formed to penetrate in the front-rear direction (see FIG. 6).

The rear wall vent 57 is opened at a position near the upper side of the top surface of the battery 33. The rear wall vent 57 causes external air to pass from the rear side of the battery box 50 toward the air cleaner 31 and cools the surface of the battery 33 by this external air.

Figure 6:
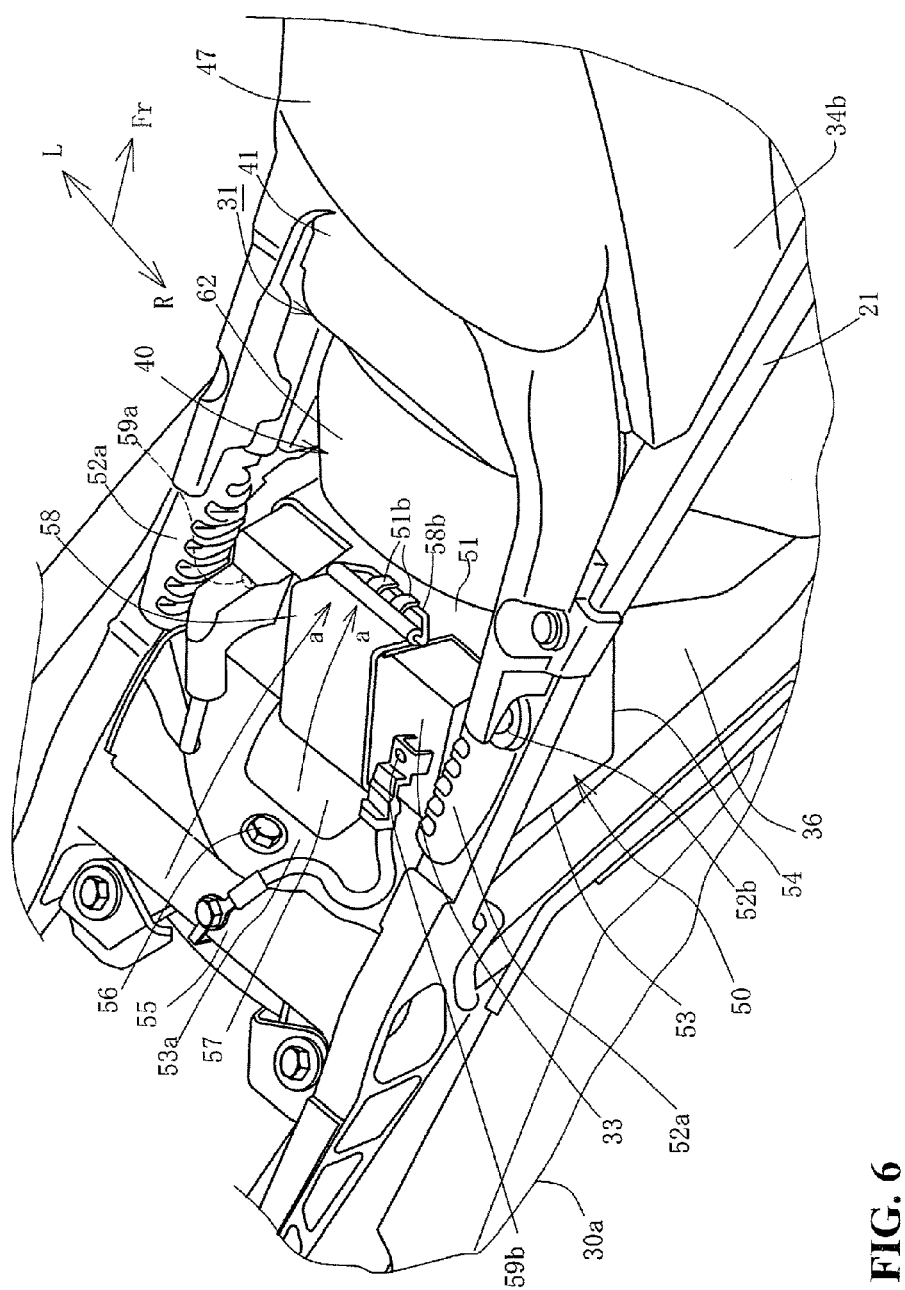
FIG. 6 is a perspective view of the part shown in FIG. 5.
Figure 7:
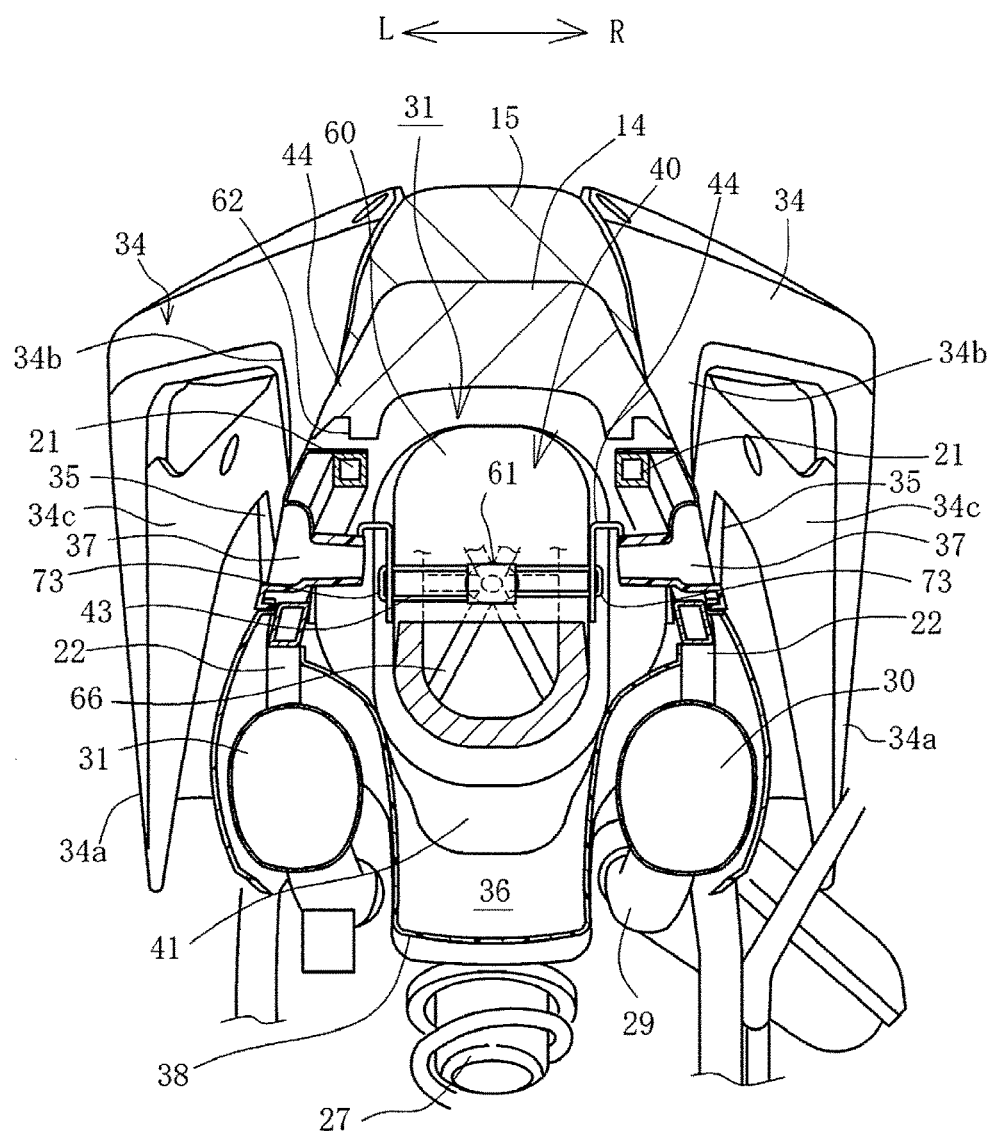
FIG. 7 is a sectional view along line 6-6 in FIG. 1.

A fixing band 58 made of rubber is stretched between the rear wall 53 below the rear wall vent 57 and the front wall 51 and presses the top surface of the battery 33. As shown in the encircled enlarged part A in FIG. 4, the side of a rear end part 58a of the fixing band 58 passes through the rear wall vent 57 from the front side to the rear side and is pivotally hinged onto the back surface of the rear wall 53. As shown in FIG. 6, the front end side traverses the top surface of the battery 33 from the rear side toward the front side and a buckle 58b provided at the front end part is locked to a hook 51b formed on the front wall 51 to protrude in a forward direction. This allows the battery 33 to be detachably fixed.

The opening width of the rear wall vent 57 is wide and is almost equivalent to the width of the fixing band 58.

The battery 33 housed in the battery box 50 feeds power to various kinds of electrical components such as an ignition system of the engine 13.

The battery 33 is a component with a comparatively-heavy weight and is disposed near the center of gravity of the vehicle by being disposed close to the air cleaner 31.

The battery 33 can be freely attached and detached to and from the battery box 50. However, by the placement near the center of gravity of the vehicle, the influence on the center of gravity of the vehicle when the battery 33 is attached or detached is reduced.

A positive (+) electrode 59a and a negative (−) electrode 59b are provided on the top surface of the battery 33 with the negative electrode 59b being grounded to the cross member 55 (see FIG. 3 or 6).

As shown in FIGS. 4 and 5, the air cleaner 31 tilts in a forward direction and the battery box 50 tilts rearwardly. Thus, the space 81 having a substantially V-shape in a side view is formed between the lower end part of the battery box 50 and the intermediate part, in the upward-downward direction, of the top surface 60 of the element 40 near the lower end part of the battery box 50. The engagement parts between the hook parts 73 of the element fixing component 43 and the locking parts 44c of the attachment fittings 44 are located on the upper side relative to the corner part 51a of the battery box 50 forming the bottom part of this space 81 having the substantially V-shape. Therefore, the engagement parts between the hook parts 73 and the locking parts 44c exist in the space 81 having the substantially V-shape and can be visually recognized from above. In addition, a hand 80 (see FIG. 10) can be placed therein from above and work of disengaging the hook parts 73 from the locking parts 44c can be performed.

Effects of the present embodiment will be described below.

As shown in FIG. 4, in the intake space 36, in which the air cleaner 31 sucks air, the flow of the intake air (shown by the arrows a) toward the engine 13 through the air cleaner 31 is generated. In this intake space 36, the air cleaner 31 and the battery 33 are disposed. Moreover, this battery 33 is disposed on the rear side of the air cleaner 31, which is the intake upstream side, close to the air cleaner 31.

Thus, the battery 33 is disposed in the flow of the intake air and therefore is efficiently cooled by utilizing the flow of the intake air toward the engine 13.

In addition, the battery 33 is housed in the battery box 50 to protect the battery 33. Moreover, even in this state, the flow of intake air is generated around the battery 33 in the battery box 50 and thus the cooling performance of the battery 33 is improved.

The engine 13 is located near the center of gravity of the vehicle and the air cleaner 31 is also disposed near the engine 13 to thereby be located near the center of gravity of the vehicle. Because the battery 33 is disposed near this air cleaner 31, the battery 33 as a heavy component can be disposed near the engine 13, i.e. near the center of gravity of the vehicle. Thus, a concentration of mass on the center of gravity of the vehicle can be achieved and the traveling stability can be improved.

In addition, the battery 33 is removably provided. Thus, even if the battery 33 is removed when the battery is unnecessary, the influence on the balance of the center of gravity can be suppressed because the battery 33 is originally disposed near the center of gravity of the vehicle.

Such a situation in which the battery is unnecessary occurs with a race vehicle of a kick start type for example. In such a race vehicle, the battery is often removed for reducing the weight.

Regarding the removal of the battery 33, the battery 33 is attached and detached to and from the battery box 50 in some cases and the battery box 50 is attached and detached together with the battery 33 in other cases. Moreover, if the battery box is not provided, the battery 33 is attached and detached to and from the vehicle body directly.

The battery box 50 is disposed with a rearward tilt with respect to the air cleaner 31 and the corner part 51a made at the front lower end part is brought closest to the top surface 60 of the element 40, with a slight gap formed therebetween. Therefore, a space is ensured between the element 40 of the air cleaner 31 and the battery box 50. Thus, an obstacle to the flow of intake air to the element 40 due to the battery box 50 can be made small and the efficiency of intake to the engine can be improved.

In addition, the rear wall 53 of the battery box 50 is disposed along the rear fender 38 having a circular arc shape. This allows the battery box 50 and the battery 33 to be easily held in a tilted state. In addition, the amount of protrusion toward the rear fender 38 is reduced and thus the battery box 50 can be compactly disposed.

Moreover, because the battery 33 is housed in the battery box 50, the battery 33 can be protected by the battery box 50 and the flow of air around the battery 33 can be formed by the flow of intake air. This can cool even the battery 33 housed in the battery box 50.

In addition, the rear wall vent 57 is made in the rear wall 53. Thus, external air is made to pass from the rear side of the battery box 50 toward the air cleaner 31 through this rear wall vent 57. Furthermore, this external air is made to pass in the vicinity of the battery 33 housed in the battery box 50 and the surface of the battery 33 can be efficiently cooled.

Moreover, three wall parts, i.e. both the left and right sidewalls 52 and the rear wall 53, of the battery box 50 are supported to the seat rails 21 and the cross member 55, which are rigid bodies. This can enhance the support rigidity of the battery box 50.

Furthermore, to detach the element 40 from the cleaner case 41 and perform maintenance thereof, the element fixing component 43 is disengaged from the attachment fittings 44.

As shown in FIGS. 3 and 5, in the state wherein the element 40 is fixed to the cleaner case 41, the hook parts 73 of the element fixing component 43 are engaged with the locking parts 44c of the attachment fittings 44.

When the hook parts 73 are removed from the locking parts 44c in this state, the element 40 can be separated and removed from the cleaner case 41. The attachment is carried out in the reverse procedure. The element 40 is fitted to the periphery of the cleaner case 41 and then the hook parts 73 of the element fixing component 43 are engaged with the locking parts 44c of the attachment fittings 44.

At this time, the element attachment part 77 of the element fixing component 43 is inserted into the shaft hole 67 of the central holder 61 and the engagement protrusion 78 engages with the step 68 in the shaft hole 67. Therefore, the element fixing component 43 is integrated with the element 40 and does not drop off from the element 40. This integrated state is kept also in attachment or detachment of the element 40 and the element fixing component 43 can be treated integrally with the element 40 with prevention of dropping of the element fixing component 43. This makes the work of attaching or detaching the element 40 easy.

In addition, the element fixing component 43 is integrated with the element 40 at the center (position of the center of gravity) of the element 40. Thus, the upper and lower parts are symmetric and the same structure is obtained even when the element 40 is vertically reversed. Therefore, when the element 40 is attached to the cleaner case 41, the element 40 can be mounted without restriction of the attachment directionality in the upward-downward direction, which makes the mounting work easy.

As shown in FIGS. 4 and 5, the battery box 50 is disposed with a rearward tilt with respect to the air cleaner 31 tilted forward and the space 81 (FIG. 4) having a substantially V-shape is formed between the battery box 50 and the air cleaner 31. In addition, the element fixing component 43 and the fixing parts thereof according to operation of engagement with the attachment fittings 44 are located on the upper side relative to the corner part 51a of the battery box 50 as the part closest to the air cleaner 31 in the battery box 50 and are located in the space 81 having the substantially V-shape.

Therefore, in the state in which the battery box 50 remains mounted, the hook parts 73 of the element fixing component 43 integrated with the element 40 can be visually recognized from above. Thus, the element 40 can be easily attached and detached.

Moreover, as shown in FIG. 10, the hook part 73 of the element fixing component 43 corresponding to the attachment fitting 44 is disposed over the inclined side surface 62 of the element 40. Due to this, the hook part 73 of the element fixing component 43 can be disposed in the working space 82 formed over the inclined side surface 62 and a worker can place a hand 80 in this working space 82. This makes the work of attaching or detaching the element fixing component 43 easy and can facilitate attachment and detachment of the element 40.

The invention of the present application is not limited to the above-described respective embodiment examples and modifications and applications can be variously made in the principle of the invention.

For example, the air cleaner may be one having a cleaner cover that covers the element.

Also in this case, air is sucked from the intake space 36 and the battery 33 is housed and disposed in this same intake space 36.

It is also possible to omit the battery box 50. In this case, the battery 33 is disposed with a rearward tilt along the rear fender 38 similarly to the battery box 50 and the corner part 33a thereof on the front side of the lower end is brought close to the air cleaner 31 and is disposed similarly to the corner part 51a of the battery box 50.

At this time, the battery 33 may be supported by a support member having a substantially L-shape, for example. This example is shown in an encircled part B in FIG. 4. In this diagram, a support member 50A is formed into a substantially L-shape in side view with a rear part 53A and a bottom part 54A and the battery 33 is supported thereon. For fixing of the battery 33 to the support member 50A, an appropriate member such as the fixing band 58 shown in FIG. 6 and so forth is used. For support of the support member 50A to the vehicle body frame, the support member 50A is attached to the cross member 55 by a bolt 56A. In addition, the left and right sides are also supported to the seat rails 21 by appropriate stays according to need. A tip 54a of the bottom part 54 is provided and the corner part 33a of the battery 33 at the front lower part thereof is located near the tip 54a. If this corner part 33a or the tip 54a of the bottom part 54 is located near the element fixing component 43, a state similar to that of the case of the above-described battery box 50 is obtained.

Moreover, it is also possible to omit the attachment fittings 44. In this case, the element fixing component 43 is directly engaged with locking parts formed at part of the cleaner case 41.

Another embodiment of the present invention will be described with reference to accompanying FIGS. 11 to 18. In the following description, the respective directions such as front, rear, upward, downward, left, and right directions refer to directions as seen from a rider riding a motorcycle.

Figure 11:
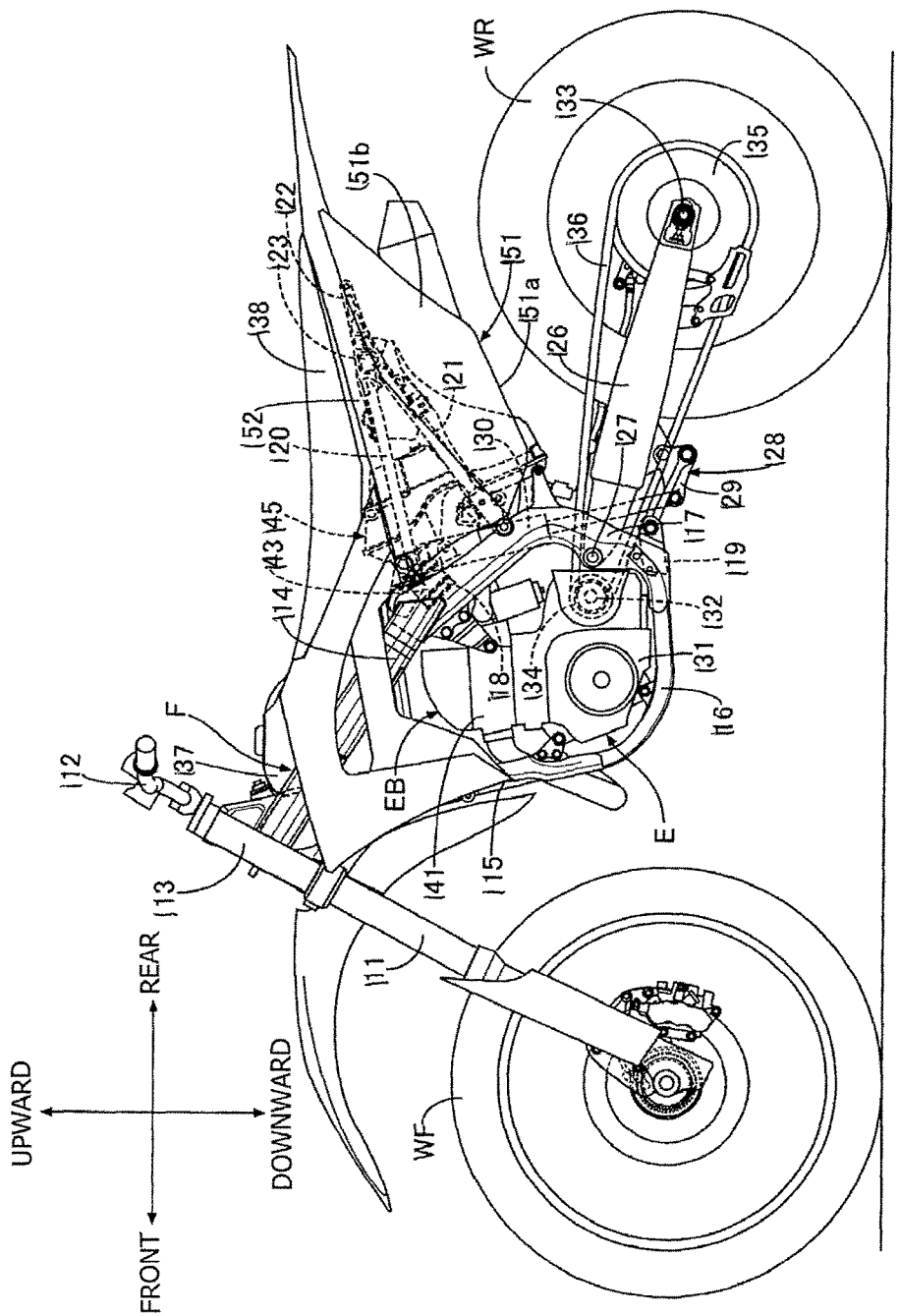
FIG. 11 is a left side view of a motorcycle.

Referring first to FIG. 11, this motorcycle is one for motocross competition and its vehicle body frame F includes the following parts a head pipe 113 that steerably bears a front fork 111 that pivotally supports a front wheel WF and a bar-shaped steering handlebar 112; a pair of left and right main frames 114 extending from the head pipe 113 toward the lower rear side; a down-frame 115 extending from the head pipe 113 toward the lower rear side at a steeper angle than these main frames 114; a pair of left and right lower frames 116 that are provided consecutively with the lower end part of the down-frame 115 and extend rearwardly; and a pair of left and right pivot plates 117 that have upper end parts joined to the rear end parts of the main frames 114 and extend downwardly and have lower end parts with which the rear end parts of the lower frames 116 are set consecutively. The vehicle body frame F further includes the following parts an upper cross member 118 provided between the upper end parts of the pair of left and right pivot plates 117; a lower cross member 119 provided between the lower end parts of the pair of left and right pivot plates 117; a pair of left and right seat rails 120 that have front end parts joined to the upper end parts of the pivot plates 117 and extend rearwardly; a pair of left and right rear frames 121 that have front end parts joined to the intermediate parts of the pivot plates 117 in the upward-downward direction and extend toward the upper rear side; a pair of left and right joining frames 122 that join the rear parts of the seat rails 120 and the rear frames 121; and a rear cross member 123 provided between the pair of left and right joining frames 122.

An internal combustion engine E is mounted on the vehicle body frame F. An engine main body EB of the internal combustion engine E is disposed in a space surrounded by the main frames 114, the down-frame 115, the lower frames 116, and the pivot plates 117 and is supported by the down-frame 115, the lower frames 116, and the pivot plates 117.

At the lower parts of the pivot plates 117, the front end part of a swingarm 126 that pivotally supports a rear wheel WR by the rear end part is borne vertically swingably with the intermediary of a support shaft 127. A link mechanism 128 is provided between the lower cross member 119 and the swingarm 126 and a damper 130 is provided between a link member 129 forming part of the link mechanism 128 and the upper cross member 118.

A transmission (not shown) is housed in a crankcase 131 forming part of the engine main body EB and an output shaft 132 of the transmission projects from the crankcase 131 toward the left side. An endless chain 136 is wound around a drive sprocket 134 provided on the output shaft 132 and a driven sprocket 135 provided on an axle 133 of the rear wheel WR.

Above the engine main body EB, a fuel tank 137 is provided on both main frames 114. On the rear side of the fuel tank 137, a riding seat 138 is disposed to be supported by the seat rails 120.

Figure 12:
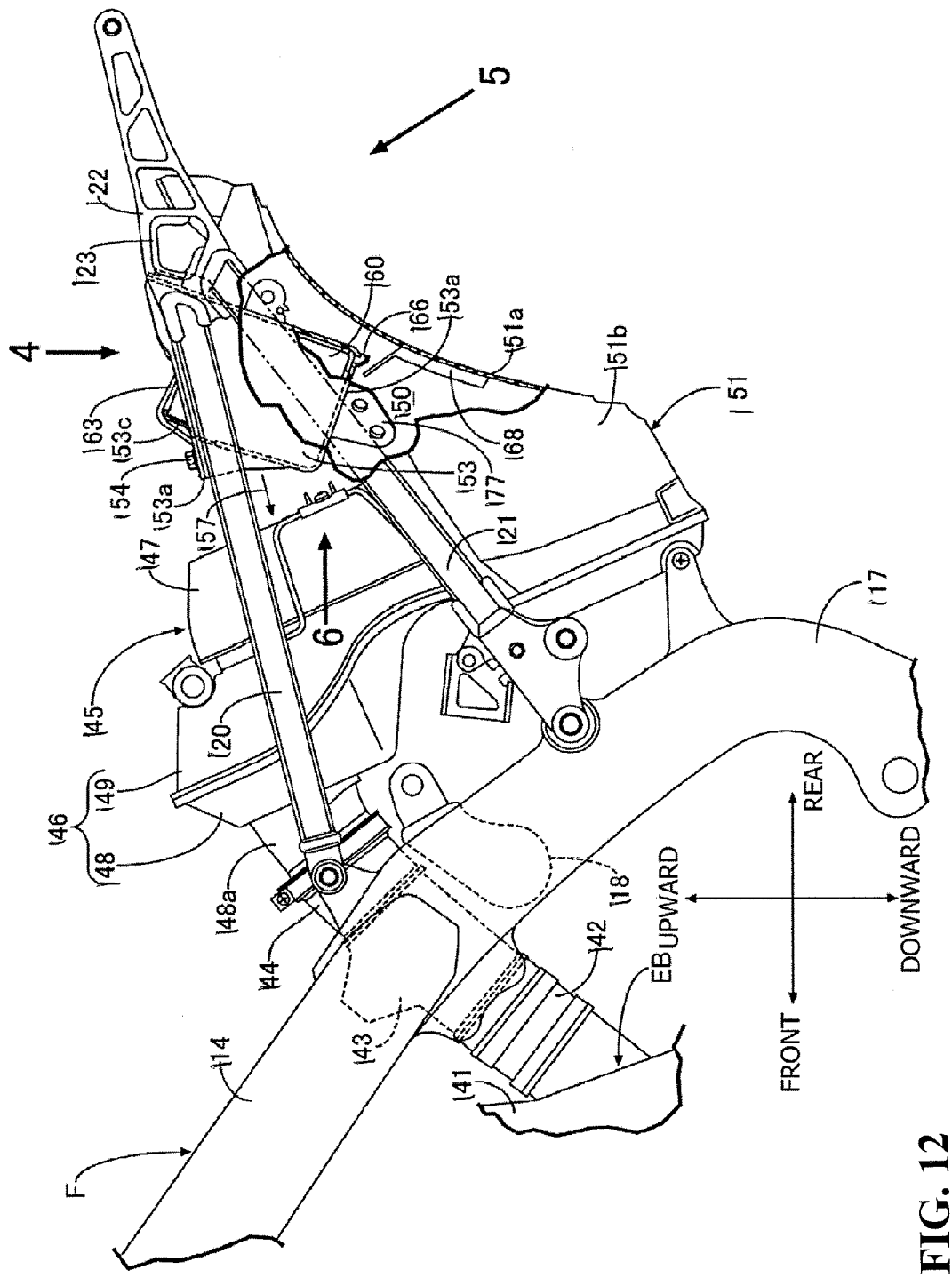
FIG. 12 is a side view of an air cleaner, a battery box in which a battery is housed, and part of a vehicle body frame as viewed from the left side.

Referring also to FIG. 12, the downstream end of a throttle body 143 is connected to the rear wall of a cylinder head 141 forming part of the engine main body EB with the intermediary of an insulator 142. To the upstream end of the throttle body 143, the downstream end of a connecting tube 144 whose upstream end part is connected to an air cleaner 145 is connected.

Figure 13:
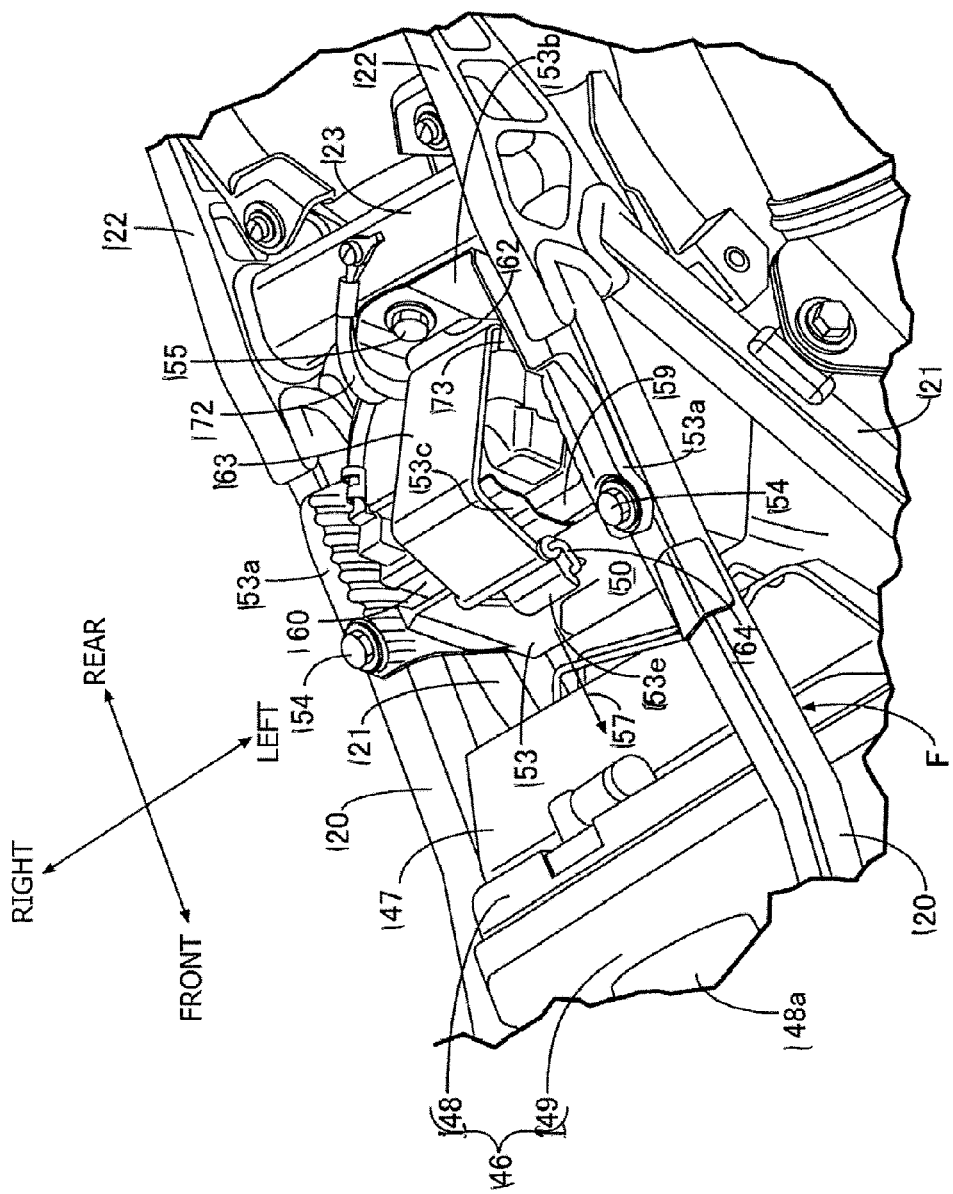
FIG. 13 is a perspective view of the part shown in FIG. 12 as viewed from the left front side and from above obliquely.

Referring also to FIG. 13, the air cleaner 145 is disposed on the rear side of the upper cross member 118 and the damper 130 and below the riding seat 138.

The air cleaner 145 includes a clean side case 146 and a cleaner element 147 attached to the clean side case 146 and is disposed between the pair of left and right seat rails 120 and between the pair of left and right rear frames 121.

The clean side case 146 is composed of a front case member 148 monolithically having a connecting conduit 148a to which the upstream end part of the connecting tube 144 is connected and a rear case member 149 joined to the front case member 148 from the upper rear side obliquely. The cleaner element 147 is detachably attached to the rear case member 149 to cover, from the rear side, an opening (not shown) made in the rear case member 149 to be opened rearwardly.

In addition, the cleaner element 147 of the air cleaner 145 is disposed to face the front part of an uncleaned air chamber 150. The uncleaned air chamber 150 is formed by the clean side case 146, the riding seat 138, a rear fender 151 as a cover member disposed above the rear wheel WR, and a pair of left and right side covers 152 that are continuous with the upper ends of the rear fender 151 on both left and right sides and extend upwardly.

A battery box 153, located on the upstream side in a flow direction 157 of air in the uncleaned air chamber 150 and being made of a synthetic resin, is disposed at the rear part in uncleaned air chamber 150 in front of the rear cross member 123 in the vehicle body frame F. The battery box 153 is attached to the vehicle body frame F.

Figure 14:
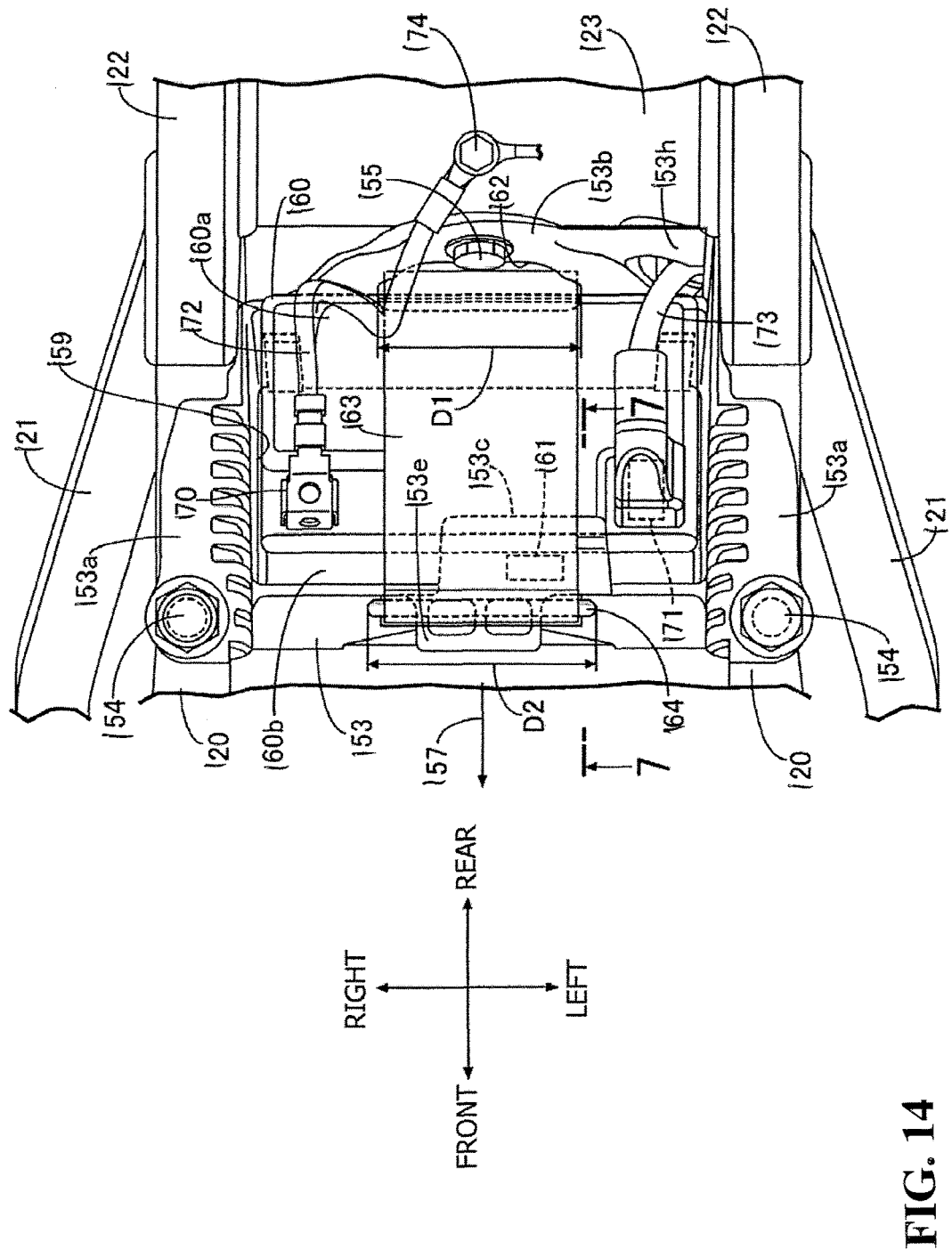
FIG. 14 is a diagram as viewed in a direction of arrow 4 in FIG. 12.
Figure 15:
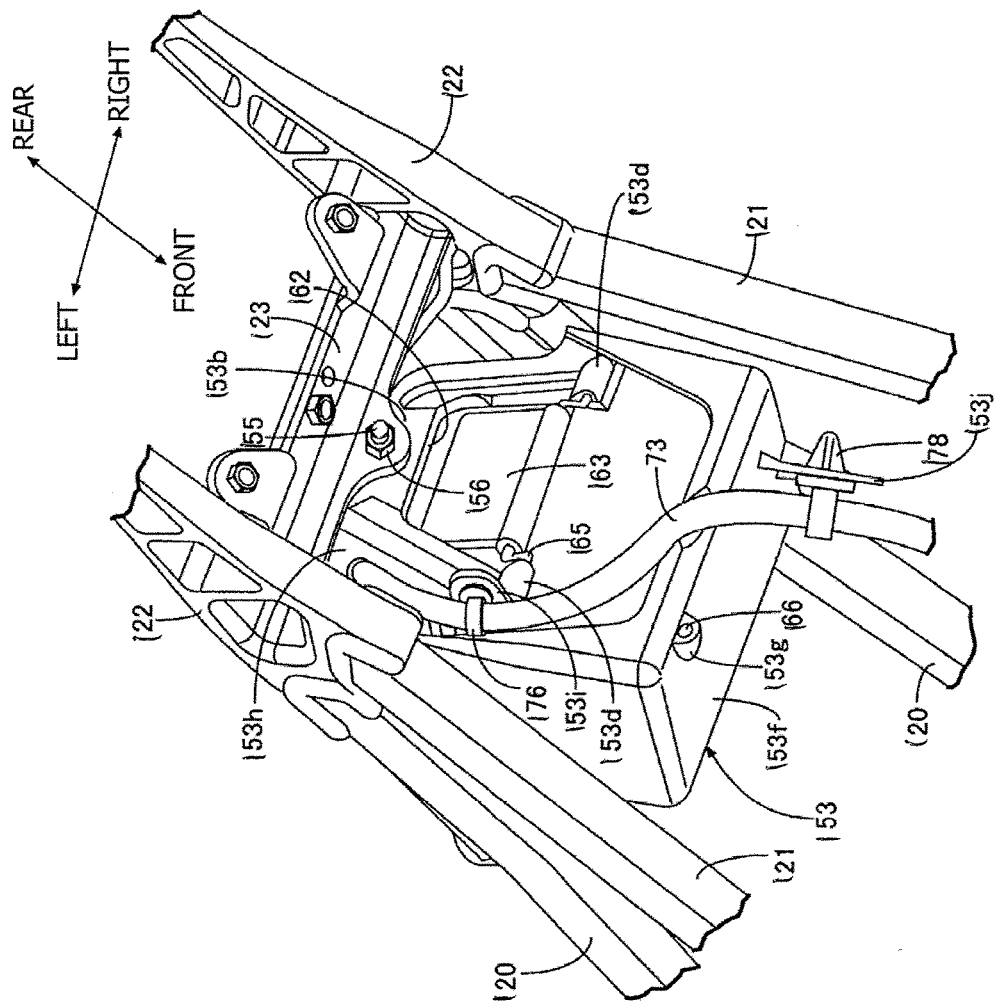
FIG. 15 is a diagram as viewed in a direction of arrow 5 in FIG. 12 in a state in which a cover member is removed.
Figure 16:
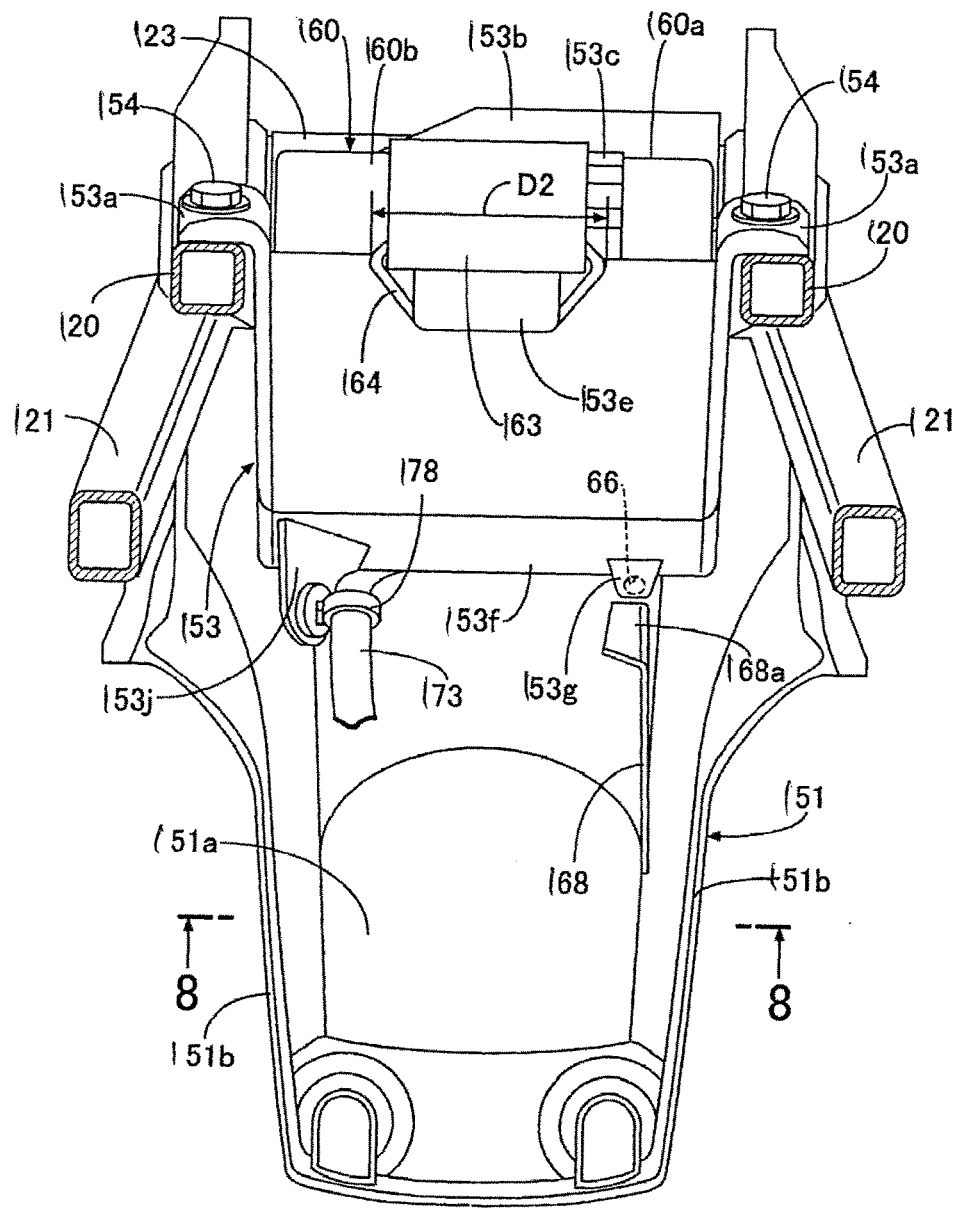
FIG. 16 is a diagram as viewed in a direction of arrow 6 in FIG. 12.

Referring also to FIGS. 14 to 16, attachment arm parts 153a are monolithically provided on both sides of the front part of the battery box 153 in the vehicle width direction and these attachment arm parts 153a are attached onto the seat rails 120 in the vehicle body frame F by bolts 154. Furthermore, an attachment protrusion 153b protruding upwardly is monolithically provided at the rear part of the battery box 153 and the attachment protrusion 153b is attached to the front surface of the central part of the rear cross member 123 in the vehicle width direction by a bolt 155 and a nut 156 (see FIG. 15).

An opening 159 opened upward is made in the battery box 153 wherein a battery 160 may be insertably and removably, through the opening 159, housed in the battery box 153. In the state in which the battery 160 is housed in the battery box 153, part of the outer surface of the battery 160 faces the external from the opening 159. In this embodiment, an upper outer surface 160a of the battery 160 and the upper part of a side outer surface 160b of the battery 160 face the external from the opening 159.

Figure 17:
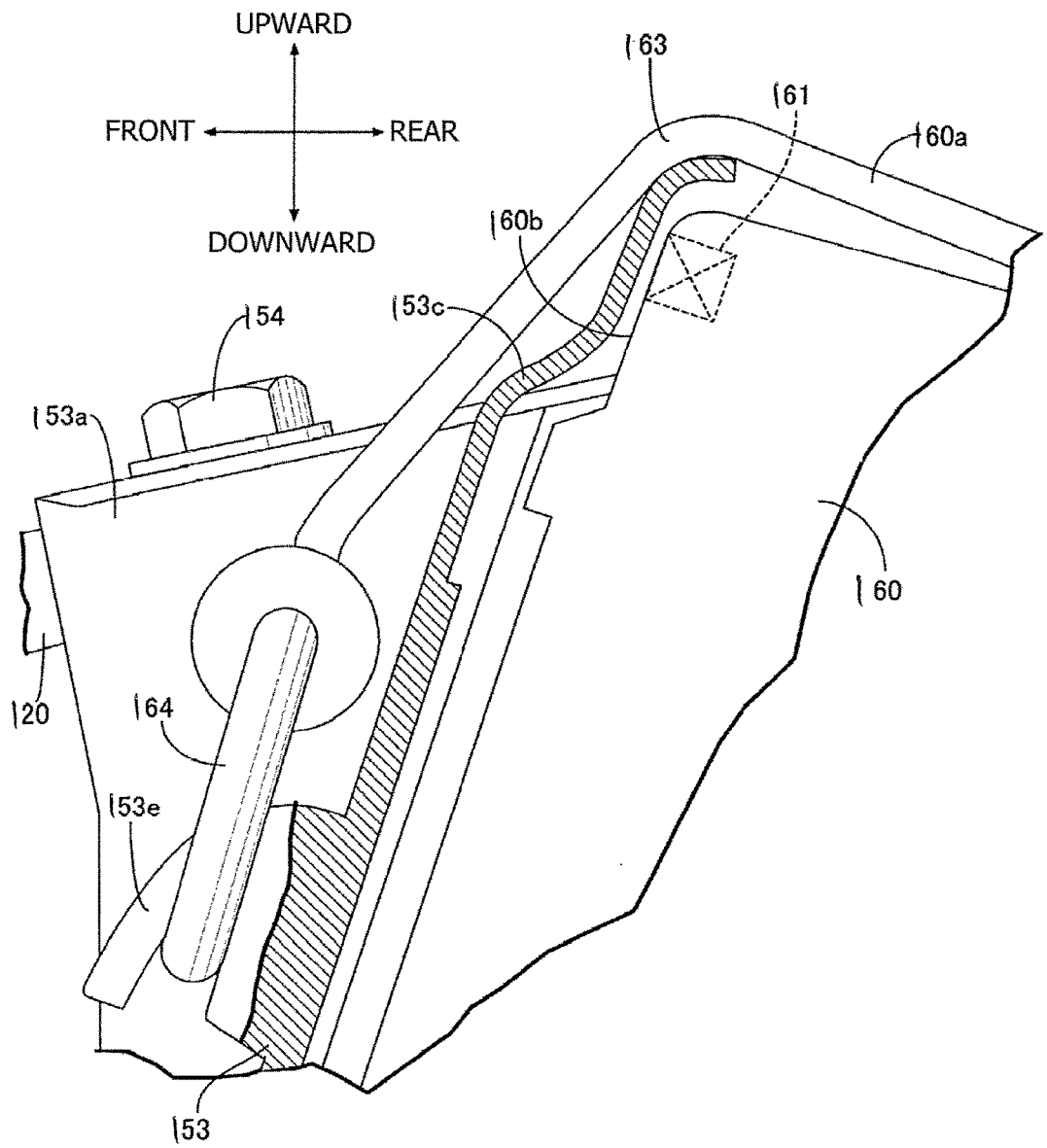
FIG. 17 is a sectional view along line 7-7 in FIG. 14.

In FIG. 17, the battery 160 is provided with a degassing part 161 for venting a gas generated at the time of an overcharge. The degassing part 161 has an explosion-proof valve opened in response to the reaching of the pressure in the battery 160 to a predetermined pressure or higher. In this embodiment, the degassing part 161 is provided at the part facing the front side in the upper part of the side outer surface 160b of the battery 160 in the state of being housed in the battery box 153.

In addition, an anti-diffusion cover part 153c that is continuous with an edge of the opening 159 and covers the degassing part 161 is provided continuously with the side surface facing the side of the cleaner element 147 disposed to face the uncleaned air chamber 150 among the side surfaces of the battery box 153. In this embodiment, the anti-diffusion cover part 153c, extending upwardly from the front edge of the opening 159, is provided monolithically with the battery box 153 in such a manner so as to be continuous with the front side surface of the battery box 153.

The upper end part of the anti-diffusion cover part 153c is formed to cover the front part of the upper outer surface 160a of the battery 160. However, when the battery 160 is inserted or removed into or from the battery box 153 through the opening 159, the tip part of the anti-diffusion cover part 153c can bend to allow for the insertion or removal of the battery 160.

In addition, the battery box 153 is disposed on the upstream side in the flow direction 157 of air in the uncleaned air chamber 150, i.e. at the rear part in the uncleaned air chamber 150. A vent hole 162 is made at the upstream-side end part in the flow direction 157, i.e. at the rear part, of the battery box 153. In this embodiment, the vent hole 162 having a rectangular shape is made in the attachment protrusion 153b, which the battery box 153 has at its rear part.

Furthermore, the battery box 153 is provided with a fixing member 63 for detachably fixing the battery 160 in the battery box 153 in such a manner that at least part of the fixing member 163 overlaps with the anti-diffusion cover part 153c.

The fixing member 163 is formed into a band shape by an elastic material such as rubber. The fixing member 163 passes through the vent hole 162 and is fixed to one side surface of the battery box 153. An attachment piece 164, that disengageably engages with the other side surface of the battery box 153 and has a width D2 larger than a width D1 of the vent hole 162, is provided at the other end part of the fixing member 163.

In this embodiment, the one side surface of the battery box 153, to which the fixing member 163 is fixed, is the rear side surface of the battery box 153. Both end parts of a bar-shaped support member 165 provided at one end part of the fixing member 163 are fixed to a pair of left and right support protrusions 153d monolithically provided on the rear side surface of the battery box 153 with the intermediary of an interval in the vehicle width direction. Furthermore, a locking part 153e, that disengageably engages with the attachment piece 164 provided at the other end part of the fixing member 163, is monolithically provided on the front side surface of the battery box 153.

Figure 18:
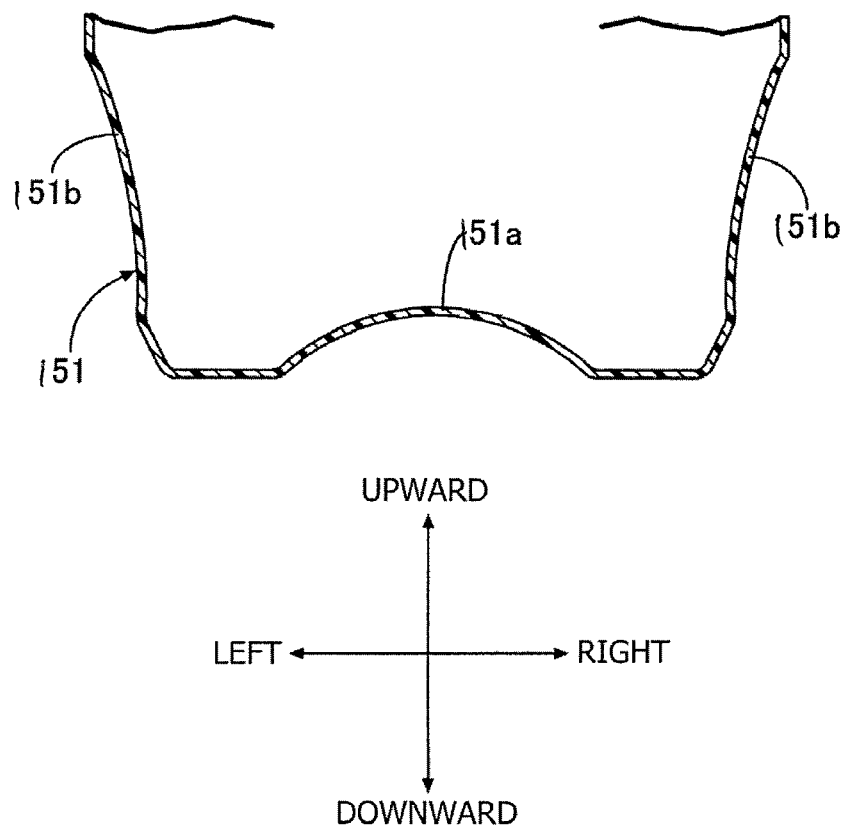
FIG. 18 is a sectional view along line 8-8 in FIG. 16.

Referring also to FIG. 18, the rear fender 151 is attached to the vehicle body frame F and has at least a rear wheel cover part 151a that is inclined to extend toward the lower front side below the battery box 153 and covers the rear wheel WR from above. In this embodiment, the rear fender 151 is formed to monolithically have the rear wheel cover part 151a that has a cross-sectional shape curved to bulge upwardly at least at the central part in the vehicle width direction (in this embodiment, at part of the central part in the vehicle width direction) and has a smoothed inner surface and a pair of side cover parts 151b that are provided consecutively with both sides of the rear wheel cover part 151a in the vehicle width direction and extend upwardly. The side cover parts 151b are fastened to the pair of left and right rear frames 121 in the vehicle body frame F and the bottom part of the uncleaned air chamber 150 is formed by the rear wheel cover part 151a. Furthermore, the side covers 152 are continuous with the upper ends of the side cover parts 151b in the rear fender 151 and extend upwardly to be fastened to the seat rails 120 and the rear frames 121 in the vehicle body frame F.

The battery box 153 is disposed to have an interval from the rear fender 151 and is supported by the seat rails 120 and the rear cross member 123 in the vehicle body frame F. A bottom wall 153f of the battery box 153 is formed with an inclination in such a manner as to be located closer to the lower side as getting closer to the inner surface of the rear wheel cover part 151a. More specifically, the rear wheel cover part 151a is formed so as to be inclined to extend toward the lower front side and the bottom wall 153f of the battery box 153 is inclined to extend toward the lower rear side.

In addition, at the lowermost part of the inclined bottom wall 153f, i.e. at the rearmost part of the bottom wall 153f, a discharge port 166 is formed that opens to the rear side toward the side of the rear wheel cover part 151a. A guide wall 153g that guides a liquid discharged from the discharge port 166 to the side of the rear fender 151 is provided monolithically with the bottom wall 153f of the battery box 153.

On the inner surface of the rear fender 151, a restricting wall 168 that restricts the flow direction of the liquid discharged from the discharge port 166 is provided in a protruding manner. The restricting wall 168 is provided to protrude at the joining part between the left end part of the rear wheel cover part 151a and the left side cover part 151b corresponding to the making of the discharge port 66 at the left-side lowermost part of the bottom wall 153f. At the upper end part of the restricting wall 168, an inclined guide part 68a that receives the liquid flowing out from the discharge port 166 and causes the liquid to flow to the side of the left side cover part 151b is monolithically formed.

On the upper outer surface of the battery 160, a negative-side connecting terminal 170 and a positive-side connecting terminal 171 are provided with the intermediary of an interval in the left-right direction. One end part of a ground wire 172 whose other end is connected to the negative-side connecting terminal 170 is fastened to the rear cross member 123 in the vehicle body frame F by a screw member 174. Furthermore, one end part of a power feed cable 173 is connected to the positive-side connecting terminal 171 and the power feed cable 173 passes through the rear side of the battery box 153 and then the lower side of the battery box 153 to extend in a forward direction.

On the left side of the upper part of the attachment protrusion 153b of the battery box 153, a folded-back part 153h formed into a shape obtained by folding back into a substantially C-shape is monolithically provided to protrude toward the left seat rail 120. Furthermore, in order to prevent the power feed cable 173 from getting contact with the left seat rail 120 and be damaged in its outer coat, the power feed cable 173 is wired to penetrate the folded-back part 153*h* with the intermediary of part of the folded-back part 153*h* between the power feed cable 173 and the left seat rail 120. Moreover, the power feed cable 173 is supported, with the intermediary of a clip 176, by a first support plate part 153*i* provided monolithically and consecutively with the left support protrusion 53*d* in the pair of support protrusions 153*d* provided on the rear sidewall of the battery box 153 in a protruding manner. In addition, the power feed cable 173 is supported, with the intermediary of a clip 178, by a second support plate part 153*j* provided on the right side of the bottom wall 153*f* of the battery box 153 in a protruding manner.

The effects of this embodiment will hereinafter be described. The battery 160 is housed in the battery box 153 in which the opening 159 is made in such a manner that part of the outer surface of the battery 160 is made to face the opening 159. Thus, heat release from the battery 160 can be facilitated and heat accumulation of the battery 160 can be suppressed. In addition, replacement of the battery 160 can be made easy. Furthermore, the degassing part 161 possessed by the battery 160 is disposed to face the opening 159 and the battery box 153 is provided with the anti-diffusion cover part 153*c* that is continuous with an edge of the opening 159 and covers the degassing part 161. Therefore, when a gas generated at the time of an overcharge of the battery 160 is vented from the degassing part 161, diffusion of the vented gas to the inside of the vehicle body can be prevented by the anti-diffusion cover part 153*c*.

Moreover, the battery box 153 is provided with the fixing member 163 for detachably fixing, in the battery box 153, the battery 160 housed in the battery box 153 in such a manner that at least part of the fixing member 163 overlaps with the anti-diffusion cover part 153*c*. Therefore, the fixing member 163 is disposed near the degassing part 161 in the state in which the battery 160 is fixed by the fixing member 163. Thus, diffusion of the gas vented from the degassing part 161 to the inside of the vehicle body is prevented more effectively, and replacement of the battery 160 is easy when the fixing of the battery 160 is released.

Furthermore, the rear fender 151, having at least the rear wheel cover part 151*a* that is disposed below the battery box 153 for covering the rear wheel WR from above, is attached to the vehicle body frame F. In addition, the bottom wall 153*f* of the battery box 153 is formed with an inclination in such a manner so as to be located closer to the lower side when getting closer to the inner surface of the rear wheel cover part 151*a*. The discharge port 166, opened toward the side of the rear wheel cover part 151*a*, is made at the lowermost part of the bottom wall 153*f*. Thus, a liquid in the battery box 153 is caused to drop from the discharge port 166 to the side of the rear wheel cover part 151*a* and the liquid travels on the inner surface of the rear fender 151. Therefore, the liquid in the battery box 153 can be discharged from the inside of the battery box 153 without being splashed.

Moreover, the battery box 153, dispose to have an interval from the rear fender 151, is supported by the vehicle body frame F. The guide wall 153*g*, that guides the liquid discharged from the discharge port 166 to the side of the rear fender 151, is provided monolithically with the bottom wall 153*f* of the battery box 153. Thus, the liquid discharged from the discharge port 166 is guided to the side of the rear fender 151 by the guide wall 153*g* and the liquid can be led to the inner surface side of the rear fender 151 without being splashed. In addition, because the interval is made between the battery box 153 and the rear fender 151, vibrations are not conveyed from the side of the rear fender 151 to the side of the battery box 153.

Furthermore, the rear fender 151 is formed to monolithically have the rear wheel cover part 151*a* that has a cross-sectional shape curved to bulge upwardly at least at the central part in the vehicle width direction and has a smoothed inner surface and the pair of side cover parts 151*b* that are provided consecutively with both sides of the rear wheel cover part 151*a* in the vehicle width direction and extend upwardly. Therefore, the liquid that drops from the discharge port 166 to the side of the rear wheel cover part 151*a* is smoothly led to the part between the rear wheel cover part 151*a* and one side cover part 151*b* along the inner surface of the part having the cross-sectional shape bulging upwardly in the rear wheel cover part 151*a*. This can suppress splashing of the liquid to the inside of the vehicle body more surely.

In addition, the restricting wall 168 that restricts the flow direction of the liquid discharged from the discharge port 166 is provided in a protruding manner on the inner surface of the rear fender 151. Thus, by restricting the flow direction of the liquid discharged from the discharge port 166 by the restricting wall 168, the liquid can be led to a predetermined site without spreading on the inner surface of the rear fender 151.

Moreover, the bottom part of the uncleaned air chamber 150 facing the cleaner element 147 of the air cleaner 145 of the internal combustion engine E mounted on the vehicle body frame F is formed by the rear wheel cover part 151*a* of the rear fender 151. The anti-diffusion cover part 153*c* is provided in the battery box 153 continuously with the side surface facing the side of the cleaner element 147 among the side surfaces of the battery box 153 disposed in the uncleaned air chamber 150. Thus, the battery 160 can be protected by the rear fender 151 and the battery 160 can be effectively cooled by utilizing the flow of intake air in the uncleaned air chamber 150. In addition, because the anti-diffusion cover part 153*c* is continuous with the side surface facing the side of the cleaner element 147 among the side surfaces of the battery box 153, the flow of the gas vented from the degassing part 161 of the battery 160 to the side of the cleaner element 147 can be suppressed.

Furthermore, the battery box 153 is disposed in the uncleaned air chamber 150 in such a manner so as to be located on the upstream side in the flow direction 157 of air in the uncleaned air chamber 150 and the vent hole 162 is made at the upstream-side end part of the battery box 153 in the flow direction 157. Thus, intake air can be made to flow on the lateral sides of the battery 160 in the battery box 153, which enables effective cooling of the battery 160.

Moreover, the fixing member 163 formed into a band shape by an elastic material passes through the vent hole 162 and is fixed to one side surface of the battery box 153. The attachment piece 164, that disengageably engages with the other side surface of the battery box 153 and has the width D2 larger than the width D1 of the vent hole 162, is provided at the other end part of the fixing member 163. Thus, by engaging the attachment piece 164 with the peripheral part of the vent hole 162 when the battery 160 is removed, the fixing member 163 can be prevented from coming off from the battery box 153, which can achieve improvement in the working performance in battery replacement or the like.

Although the embodiment of the present invention is described above, the present invention is not limited to the above embodiment and various design changes can be made without departing from the present invention set forth in the scope of claims.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A motorcycle including an engine, an air cleaner for supplying clean air to the engine, said air cleaner including a cleaner case having an element removably attached thereto, and a battery for supplying power to at least an ignition system of the engine, the motorcycle comprising:
    an intake space for sucking external air, said intake space being formed by a rear fender on a rear side and an undercover on a lower side, said element being disposed in the intake space; and
    said battery being disposed in the intake space and being disposed on an intake upstream side of the element and adjacent to the element,
    wherein the element is fitted in a longitudinal direction of the motorcycle and arranged to be vertically elongated with a top surface having a substantially oval shape or a substantially elliptical shape and being disposed with a longer diameter side oriented along an upward/downward direction and with a shorter diameter side oriented along a left/right direction and further including a battery box for housing the battery, said battery box being disposed at a tilt with respect to the air cleaner in such a manner that a corner part of the battery box at a lower end of the battery box is adjacent to the air cleaner.

2. The motorcycle according to claim 1, wherein the element is on the intake upstream side, and
    wherein the battery is disposed at a tilt with respect to the element in such a manner that a corner part of the battery at a lower end of the battery is adjacent to the element.

3. The motorcycle according to claim 2, wherein the air cleaner includes the element, the cleaner case to which the element is attached, and an element fixing component for removably fixing the element to the cleaner case wherein the element fixing component is allowed to be freely attached and detached to and from the cleaner case; and
    an attachment/detachment part in the element fixing component is disposed on an upper side relative to the corner part of the battery.

4. The motorcycle according to claim 3, wherein:
    the element has an inclined side surface; and
    the attachment/detachment part in the element fixing component is provided over the inclined side surface of the element.

5. The motorcycle according to claim 1, wherein the intake space is longer relative to the length of the battery box in the longitudinal direction of the motorcycle and the intake space extends downwardly from a bottom of the battery box.

6. The motorcycle according to claim 1, and further including a side vent formed at a rear portion of a side cover, said side vent being disposed adjacent to a lateral side of the battery box.

7. The motorcycle according to claim 1, wherein:
    the element has an inclined side surface; and
    the attachment/detachment part in the element fixing component is provided over the inclined side surface of the element.

* * * * *